(12) United States Patent
Thomas et al.

(10) Patent No.: US 12,704,621 B2
(45) Date of Patent: Aug. 11, 2026

(54) SIDELINK TIMING-BASED POSITIONING

(71) Applicant: Lenovo (Singapore) Pte. Ltd., New Tech Park (SG)

(72) Inventors: Robin Thomas, Bad Nauheim (DE); Karthikeyan Ganesan, Kronberg im Taunus (DE); Ankit Bhamri, Rödermark (DE); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 686 days.

(21) Appl. No.: 18/020,773

(22) PCT Filed: Aug. 10, 2021

(86) PCT No.: PCT/IB2021/057347
§ 371 (c)(1),
(2) Date: Feb. 10, 2023

(87) PCT Pub. No.: WO2022/034483
PCT Pub. Date: Feb. 17, 2022

(65) Prior Publication Data

US 2023/0296752 A1 Sep. 21, 2023

Related U.S. Application Data

(60) Provisional application No. 63/063,824, filed on Aug. 10, 2020, provisional application No. 63/063,836, (Continued)

(51) Int. Cl.
*G01S 13/87* (2006.01)
*G01S 5/00* (2006.01)
(Continued)

(52) U.S. Cl.
CPC .......... *G01S 13/876* (2013.01); *G01S 5/0036* (2013.01); *G01S 5/0072* (2013.01); *G01S 5/0236* (2013.01);
(Continued)

(58) Field of Classification Search
CPC ... H04W 72/02; H04W 72/563; H04W 92/18; H04W 76/14; G01S 2205/008;
(Continued)

(56) References Cited

U.S. PATENT DOCUMENTS 11,496,988 B2 * 11/2022 Manolakos ........... H04L 27/261
11,609,299 B2 * 3/2023 Bao ......................... G01S 5/021
(Continued)

FOREIGN PATENT DOCUMENTS

WO 2017027450 A1 2/2017
WO 2019153129 A1 8/2019
(Continued)

OTHER PUBLICATIONS

PCT/IB2021/057347, "Notification of Transmittal of the International Search Report and the Written Opinion of the International Searching Authority, or the Declaration", International Searching Authority, Feb. 28, 2022, pp. 1-18.
(Continued)

*Primary Examiner* — Kabir A Timory
(74) *Attorney, Agent, or Firm* — Kunzler Needham Hilton

(57) ABSTRACT

One instance of a user equipment (UE) apparatus includes a target UE configured to receive sidelink ("SL") positioning reference signals ("SL-PRS") from a reference node and two or more additional UEs, measure SL reference signal timing differences ("RSTDs") between the two or more additional UEs with respect to the reference node, and determine an estimated location of the target UE based on a time-difference-of-arrival ("TDOA") positioning technique using the
(Continued)

SL RSTDs. Another instance of UE apparatus includes a target UE configured to transmit SL-PRS to one or more additional UEs, receive SL positioning reference signals from a one or more additional UEs, and determine an estimated location of the target UE based on a SL round-trip time ("RTT") positioning technique using the SL-PRS transmitted and received between the target UE and additional UEs.

20 Claims, 14 Drawing Sheets

Related U.S. Application Data filed on Aug. 10, 2020, provisional application No. 63/063,854, filed on Aug. 10, 2020.

(51) Int. Cl.

| | |
|---|---|
| ***G01S 5/02*** | (2010.01) |
| ***G01S 5/08*** | (2006.01) |
| ***G01S 5/10*** | (2006.01) |
| ***G01S 5/14*** | (2006.01) |
| ***G01S 13/76*** | (2006.01) |
| ***H04L 5/00*** | (2006.01) |
| ***H04W 72/02*** | (2009.01) |
| ***H04W 72/563*** | (2023.01) |
| *H04W 92/18* | (2009.01) |

(52) U.S. Cl.
CPC .............. *G01S 5/0289* (2013.01); *G01S 5/08* (2013.01); *G01S 5/10* (2013.01); *G01S 5/14* (2013.01); *G01S 13/765* (2013.01); *H04L 5/0051* (2013.01); *H04W 72/02* (2013.01); *H04W 72/563* (2023.01); *G01S 2205/008* (2013.01); *H04W 92/18* (2013.01)

(58) Field of Classification Search
CPC .... G01S 5/0045; G01S 5/0284; G01S 5/0226; H04L 5/0048
See application file for complete search history.

(56) References Cited

U.S. PATENT DOCUMENTS

| | | | |
|---|---|---|---|
| 2016/0095080 | A1 | 3/2016 | Khoryaev et al. |
| 2019/0230618 | A1 | 7/2019 | Saur et al. |
| 2020/0154240 | A1 | 5/2020 | Edge et al. |
| 2021/0014831 | A1 | 1/2021 | Ryu et al. |
| 2022/0014872 | A1* | 1/2022 | Balasubramanian ........................ H04W 4/023 |
| 2022/0039054 | A1 | 2/2022 | Balasubramanian et al. |
| 2023/0209494 | A1 | 6/2023 | Dai et al. |
| 2023/0296722 | A1 | 9/2023 | Shrestha et al. |
| 2023/0305099 | A1 | 9/2023 | Thomas et al. |
| 2023/0309066 | A1 | 9/2023 | Ganesan et al. |

FOREIGN PATENT DOCUMENTS

| | | | |
|---|---|---|---|
| WO | 2019160973 | A1 | 8/2019 |
| WO | 2020125310 | A1 | 6/2020 |
| WO | 2021133104 | A1 | 7/2021 |
| WO | 2021232228 | A1 | 11/2021 |

OTHER PUBLICATIONS

PCT/IB2021/057348, "Notification of Transmittal of the International Search Report and the Written Opinion of the International Searching Authority, or the Declaration", International Searching Authority, Mar. 28, 2022, pp. 1-17.

PCT/IB2021/057349, "Notification of Transmittal of the International Search Report and the Written Opinion of the International Searching Authority, or the Declaration", International Searching Authority, Jan. 31, 2022, pp. 1-22.

N. Garcia et al., "Deliverable D3.2 Report on Channel Modelling and Positioning for 5G V2X v1.0", Fifth Generation Communication Automotive Research and innovation, http://www.5g-ppp.eu, Nov. 30, 2018, pp. 1-91.

Ericsson, "Resource allocation for Mode-2 transmissions", 3GPP TSG-RAN WG1 Meeting #97 R1-1907136, May 13-17, 2019, pp. 1-18.

LG Electronics et al., "New SID: Study on use cases, scenarios, and requirements of sidelink positioning", 3GPP TSG RAN Meeting #88e RP-200859, Jun. 29-Jul. 3, 2020, pp. 1-4.

3GPP, "3rd Generation Partnership Project; Technical Specification Group Radio Access Network; Study on channel model for frequencies from 0.5 to 100 GHz (Release 16)", 3GPP TR 38.901 V16.1.0, Dec. 2019, pp. 1-101.

3GPP, "3rd Generation Partnership Project; Technical Specification Group Services and System Aspects; Service requirements for cyber-physical control applications in vertical domains; Stage 1 (Release 17)", 3GPP TS 22.104 V17.3.0, Jul. 2020, pp. 1-76.

3GPP, "3rd Generation Partnership Project; Technical Specification Group Services and System Aspects; Service requirements for the 5G system; Stage 1 (Release 17)", 3GPP TS 22.261 V17.3.0, Jul. 2020, pp. 1-83.

3GPP, "3rd Generation Partnership Project; Technical Specification Group Radio Access Network; LTE Positioning Protocol (LPP) (Release 16)", 3GPP TS 37.355 V16.1.0, Jul. 2020, pp. 1-292.

3GPP, "3rd Generation Partnership Project; Technical Specification Group Radio Access Network; NR; Physical channels and modulation (Release 16)", 3GPP TS 38.211 V16.2.0, Jun. 2020, pp. 1-131.

3GPP, "3rd Generation Partnership Project; Technical Specification Group Radio Access Network; NR; Physical layer procedures for control (Release 16)", 3GPP TS 38.213 V16.2.0, Jun. 2020, pp. 1-176.

3GPP, "3rd Generation Partnership Project; Technical Specification Group Radio Access Network; NR; Physical layer procedures for data (Release 16)", 3GPP TS 38.214 V16.2.0, Jun. 2020, pp. 1-163.

3GPP, "3rd Generation Partnership Project; Technical Specification Group Radio Access Network; NR; Physical layer measurements (Release 16)", 3GPP TS 38.215 V16.2.0, Jun. 2020, pp. 1-25.

3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.1.0, Jul. 2020, pp. 1-114.

3GPP, "3rd Generation Partnership Project; Technical Specification Group Radio Access Network; NR; Medium Access Control (MAC) protocol specification (Release 16)", 3GPP TS 38.321 V16.1.0, Jul. 2020, pp. 1-151.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

U.S. Appl. No. 18/020,890, "Office Action Summary", United States Patent and Trademark Office, Sep. 24, 2025, pp. 1-24.

U.S. Appl. No. 18/202,890, "Office Action Summary", United States Patent and Trademark Office, Apr. 22, 2025, pp. 1-33.

* cited by examiner

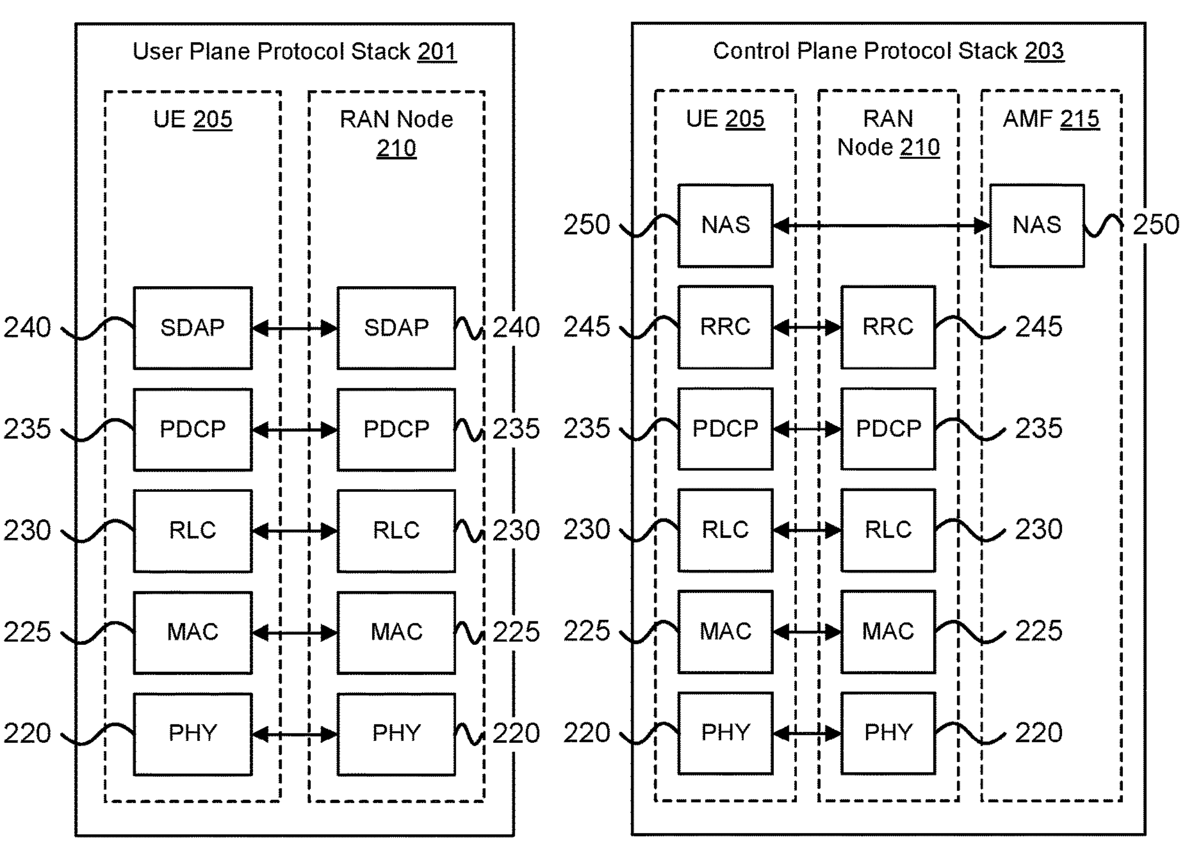
FIG. 2

400

DL-TDOA Assistance Data 400

```
-- ASN1START

NR-DL-TDOA-ProvideAssistanceData-r16 ::= SEQUENCE {
   nr-DL-PRS-AssistanceData-r16    NR-DL-PRS-AssistanceData-r16          OPTIONAL,  -- Need ON
   nr-SelectedDL-PRS-IndexList-r16    NR-SelectedDL-PRS-IndexList-r16    OPTIONAL,  -- Need ON
   nr-PositionCalculationAssistance-r16  NR-PositionCalculationAssistance-r16      OPTIONAL, -- Cond UEB
   nr-DL-TDOA-Error-r16        NR-DL-TDOA-Error-r16             OPTIONAL, -- Need ON
   ...
}
-- ASN1STOP
```

FIG. 4

DL-TDOA Measurement Report 500

```
-- ASN1START

NR-DL-TDOA-SignalMeasurementInformation-r16 ::= SEQUENCE {
    dl-PRS-ReferenceInfo-r16     DL-PRS-IdInfo-r16,
    nr-DL-TDOA-MeasList-r16         NR-DL-TDOA-MeasList-r16,
    ...
}

NR-DL-TDOA-MeasList-r16 ::= SEQUENCE (SIZE(1..nrMaxTRPs-r16)) OF
                            NR-DL-TDOA-MeasElement-r16

NR-DL-TDOA-MeasElemnt-r16 ::= SEQUENCE {
    trp-ID-r16                  TRP-ID-r16,
    nr-DL-PRS-ResourceId-r16     NR-DL-PRS-ResourceId-r16                  OPTIONAL,
    nr-DL-PRS-ResourceSetId-r16     NR-DL-PRS-ResourceSetId-r16            OPTIONAL,
    nr-TimeStamp-r16            NR-TimeStamp-r16,
    nr-RSTD-r16                     CHOICE {
            k0-r16                  INTEGER (0..1970049),
            k1-r16                  INTEGER (0..985025),
            k2-r16                  INTEGER (0..492513),
            k3-r16                  INTEGER (0..246257),
            k4-r16                  INTEGER (0..123129),
            k5-r16                  INTEGER (0..61565),
            ...
    },
    nr-AdditionalPathList-r16       NR-AdditionalPathList-r16              OPTIONAL,
    nr-TimingQuality-r16        NR-TimingQuality-r16,
    nr-DL-PRS-RSRP-Result-r16       INTEGER (0..126)                       OPTIONAL,
    nr-DL-TDOA-AdditionalMeasurements-r16
                                NR-DL-TDOA-AdditionalMeasurements-r16      OPTIONAL,
    ...
}

NR-DL-TDOA-AdditionalMeasurements-r16 ::= SEQUENCE (SIZE (1..3)) OF
                                          NR-DL-TDOA-AdditionalMeasurementElement-r16


NR-DL-TDOA-AdditionalMeasurementElement-r16 ::= SEQUENCE {
    nr-DL-PRS-ResourceId-r16     NR-DL-PRS-ResourceId-r16                  OPTIONAL,
    nr-DL-PRS-ResourceSetId-r16     NR-DL-PRS-ResourceSetId-r16            OPTIONAL,
    nr-TimeStamp-r16            NR-TimeStamp-r16,
    nr-RSTD-ResultDiff-r16          CHOICE {
            k0-r16                  INTEGER (0..8191),
            k1-r16                  INTEGER (0..4095),
            k2-r16                  INTEGER (0..2047),
            k3-r16                  INTEGER (0..1023),
            k4-r16                  INTEGER (0..511),
            k5-r16                  INTEGER (0..255),
            ...
    },
    nr-TimingQuality-r16        NR-TimingQuality-r16,
    nr-DL-PRS-RSRP-ResultDiff-r16   INTEGER (0..61)                        OPTIONAL,
    nr-AdditionalPathList-r16       NR-AdditionalPathList-r16              OPTIONAL,
    ...
}

-- ASN1STOP
```

FIG. 5

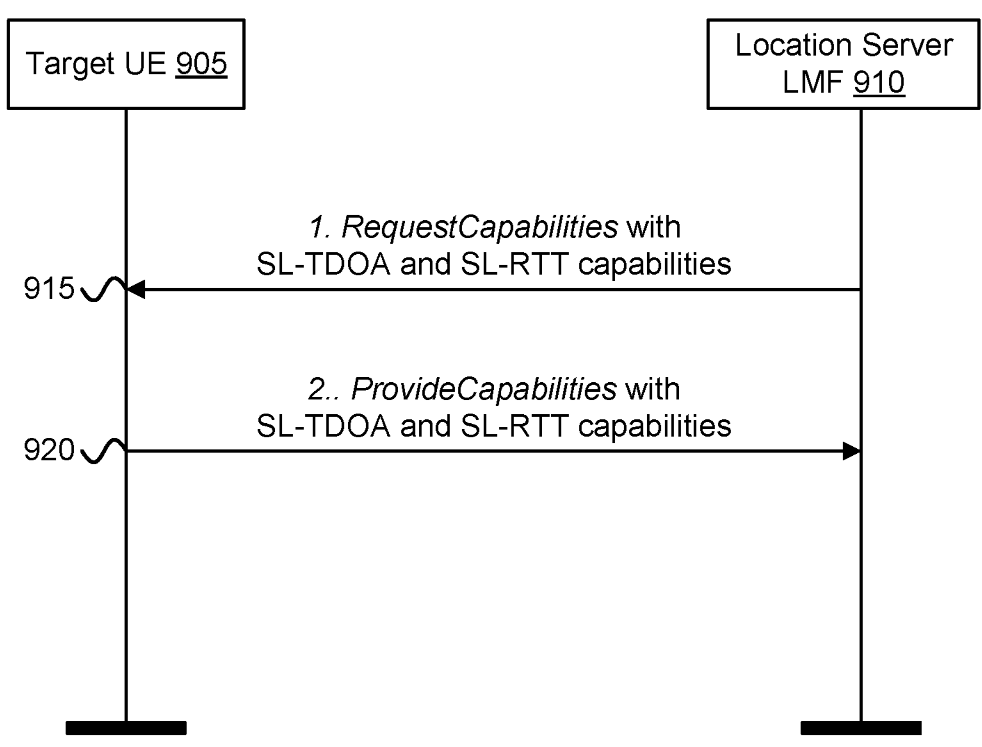
FIG. 9

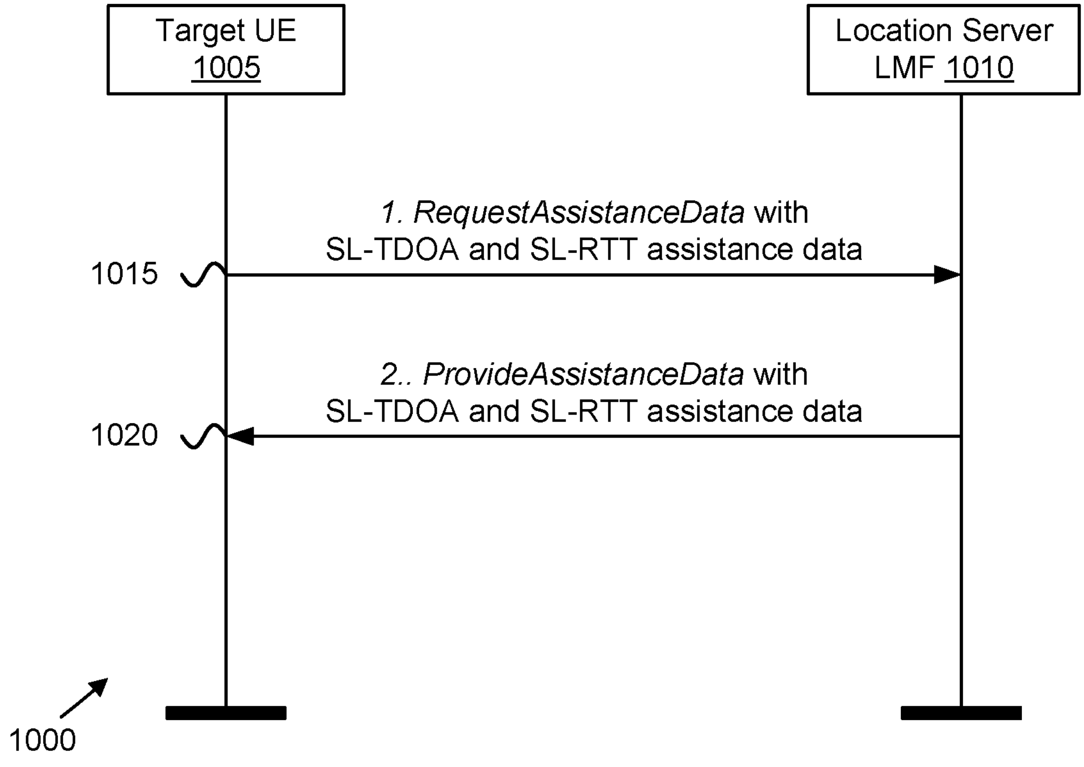
FIG. 10

SIDELINK TIMING-BASED POSITIONING

CROSS-REFERENCE TO RELATED APPLICATIONS

This application claims priority to U.S. Provisional Patent Application No. 63/063,836 titled "Sidelink Timing-Based Positioning Methods" filed on Aug. 10, 2020, U.S. Provisional Patent Application No. 63/063,854 titled "Sidelink Angular-based and SL RRM-based Positioning Methods" filed on Aug. 10, 2020, and U.S. Provisional Patent Application No. 63/063,824 titled "Apparatuses, Methods, And System For SL PRS Transmission Methodology" filed on Aug. 10, 2020, which applications are herein incorporated by reference to the extent permissible under relevant patent laws and rules.

FIELD

The subject matter disclosed herein relates generally to wireless communications and more particularly relates to sidelink timing-based positioning methods.

BACKGROUND

In certain wireless communication systems, Radio Access Technology ("RAT") dependent positioning using 3GPP New Radio ("NR") technology has been recently supported in Release 16 of the 3GPP specifications. The positioning features include Fifth Generation ("5C") network core architectural and interface enhancements, as well as Radio Access Node ("RAN") functionality that support physical layer and Layer-2/Layer-3 signaling procedures to enable RAT-dependent positioning methods for the Uu interface in LTE and NR. However, various existing systems lack adequate positioning features for sidelink ("SL") interfaces.

BRIEF SUMMARY

Disclosed are procedures for performing sidelink timing-based positioning. Said procedures may be implemented by apparatus, systems, methods, or computer program products. A User Equipment ("UE") apparatus for a communication network is disclosed and includes, in various embodiments, a target UE to be localized using sidelink ("SL") timing-based positioning, the target UE including a processor, memory, and program code executable by the processor to cause the UE to receive SL positioning reference signals ("SL-PRS") measurements from a reference node and two or more additional UEs, measure SL reference signal timing differences ("RSTDs") between the two or more additional UEs with respect to the reference node, and determine an estimated location of the target UE based on a time-difference-of-arrival ("TDOA") positioning technique using the SL RSTDs.

A further UE apparatus includes a target UE to be localized using sidelink ("SL") timing-based positioning, the target UE comprising a processor, memory, and program code executable by the processor to cause the target UE to: transmit a SL positioning reference signals ("PRS") to one or more additional UEs; receive a SL positioning reference signal from a one or more additional UEs; and use the SL interface to measure the SL round-trip times (R1'1) for SL positioning reference signals ("PRS") transmitted and received between the target UE and one or more additional UEs where: one or more SL UE Rx-Tx differences for determining the SL RTTs are obtained by: measuring the received timing of the SL subframes containing PRS; measuring the difference between the transmit and receive timing of the SL subframes containing PRS; and computing the one or more SL UE Rx-Tx timing differences.

A method for a location management function ("LMF") of a communication network is disclosed and includes determining an estimated location of a target UE to be localized using one or more sidelink timing-based positioning techniques selected from a first sidelink timing-based positioning technique and a second sidelink timing-based positioning technique. The first sidelink timing-based positioning technique includes: receiving, from the target UE to be localized, a report comprising two or more sidelink ("SL") reference signal timing differences ("RSTDs") between the target UE and two or more additional UEs with respect to a reference node, the SL RSTDs based on SL positioning reference signals ("PRS") from the reference node and the two or more additional UEs; and determining an estimated location of the target UE using a time-difference-of-arrival ("TDOA") positioning technique using the SL RSTDs. The second sidelink timing-based positioning technique includes: receiving, from the target UE to be localized, a report comprising of one or more SL RTT measurements between the target UE and one or more additional UEs; and determining an estimated location of the target UE using a SL-RTT positioning technique based on the UE Rx-Tx time difference measurements.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a block diagram of a 5G New Radio ("NR") protocol stack, in accordance with one or more embodiments of the disclosure;

FIG. 4 is a diagram illustrating downlink ("DL") time-difference-of-arrival ("TDOA") assistance data in accordance with one or more embodiments of the disclosure;

FIG. 5 is a diagram illustrating a DL-TDOA measurement report, in accordance with one or more embodiments of the disclosure;

FIG. 9 is a diagram illustrating an example of a capability signaling exchange for SL-TDOA and/or SL-RTT positioning, in accordance with one or more embodiments of the disclosure;

FIG. 10 is a diagram illustrating an example of an assistance data signaling exchange for SL-TDOA and/or SL-RTT positioning, in accordance with one or more embodiments of the disclosure;

DETAILED DESCRIPTION

Figure 1:
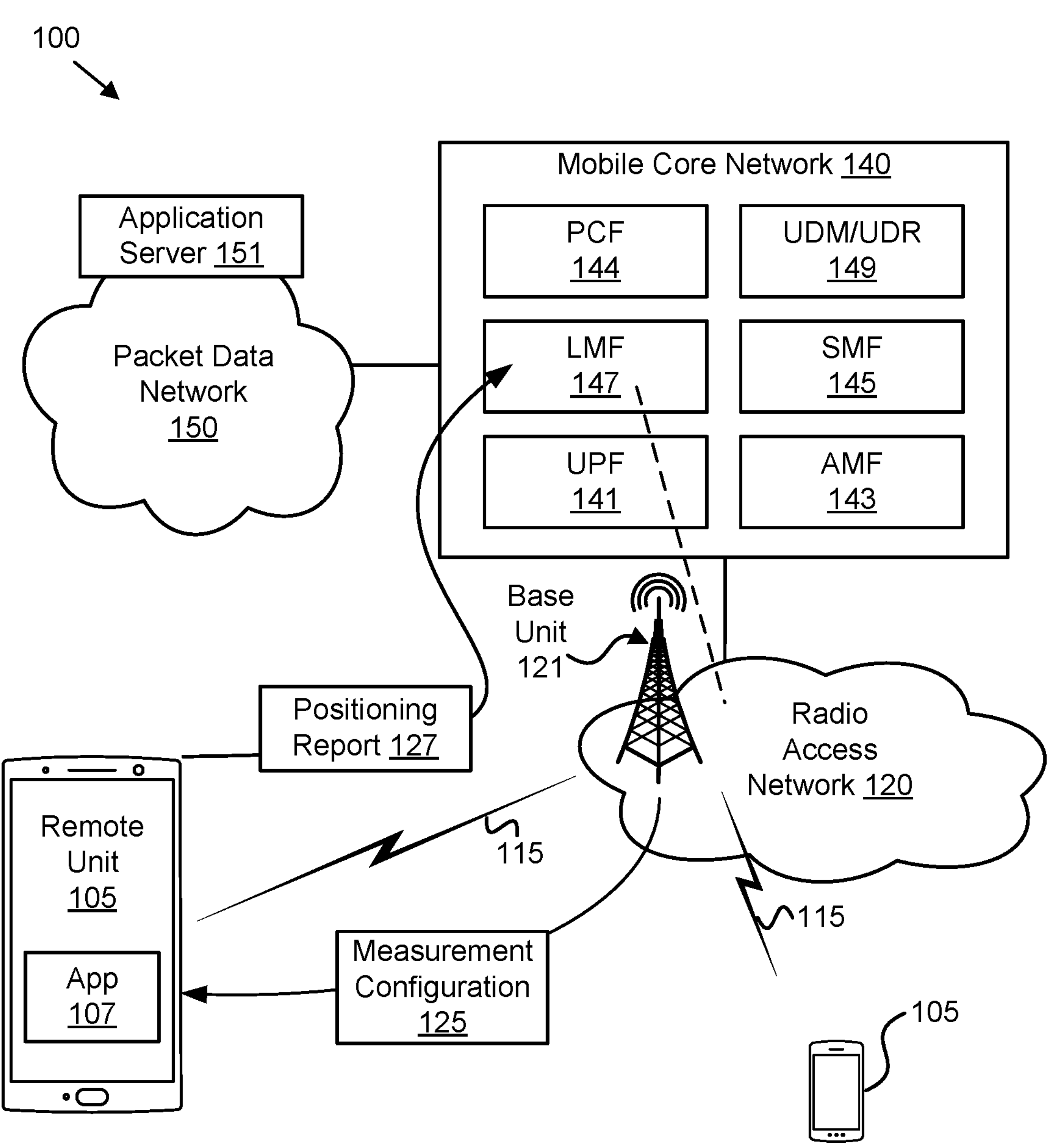
FIG. 1 is a schematic block diagram illustrating a wireless communication system for sidelink timing-based positioning methods, in accordance with one or more embodiments of the disclosure.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed to embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ('WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic to flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatuses, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

General Overview

Generally, the present disclosure describes systems, methods, and apparatuses for sidelink timing-based positioning. More specifically, the present disclosure discloses an improved signaling and measurement framework, e.g., for NR, for enabling sidelink positioning using timing-based SL-TDOA and SL-RTT RAT-dependent and RAT-independent positioning techniques.

Radio Access Technology ("RAT")-dependent positioning methods such as TDOA, RTT, angle of departure ("AoD") and cell identifier ("CID"), and U-U IRAN cell identifier ("E-CID") have been specified for the Uu interface in Long-Term Evolution ("LTE") and Third Generation Partnership Project ("3GPP") New Radio ("NR"). Similarly, these positioning techniques show high potential for application in sidelink, although there currently exists no specified methods to realize such implementations in 3GPP. Furthermore, aspects of sidelink positioning which beneficially should be addressed may include determining use cases and requirements for sidelink positioning which in existing systems may not be adapted for sidelink, e.g., in vehicle-to-everything ("V2X"), public safety, commercial services as well as potential operation scenarios and design considerations in the topics of network coverage, including in-coverage and out-of-coverage conditions; Candidate frequency bands; Usage scenario and deployment of UEs, RAT-dependent and RAT-independent positioning, and hybrids; mobile-based (performed by UE) and mobile-assisted (performed at least partial by LMF) sidelink positioning; absolute and relative positioning; and architecture.

Another feature of SL positioning is that it enables relative positioning, which may be beneficial for location estimation in mobile vehicular scenarios. For example, relative positioning is a performance requirement in the horizontal accuracy of devices in industrial internet of things ("IIoT") environments where flexible and modular assembly areas are required in a smart factory setting.

The present disclosure aims to tackle this problem and lack of functionality in cellular V2X ("C-V2X") positioning by developing timing-based mechanisms to perform SL positioning. The proposed SL positioning techniques aim to provide high accuracy depending on the scenario and radio environment.

FIG. 1 depicts a wireless communication system 100 for performing sidelink timing-based positioning, according to various embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 115. Even though a specific number of remote units 105, base units 121, wireless communication links 115, RANs 120, and mobile core networks 140 are depicted in FIG. 1, one of skill in the art will recognize that any number of remote units 105, base units 121, wireless communication links 115, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140. As described in greater detail below, the base unit(s) 121 may provide a cell operating using a first frequency range and/or a cell operating using a second frequency range.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote to unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 115. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Location Management Function ("LMF") 147, a Unified Data Management function ("UDM"") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The LMF 147 receives measurements from RAN 120 and the remote unit 105 (e.g., via the AMF 143) and computes the position of the remote unit 105. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Policy Control Function ("PCF") 144 (which provides policy rules to CP functions), a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the SGC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

As discussed in greater detail below, the remote unit 105 receives a measurement configuration 125 from the network (e.g., from the LMF 147 via RAN 120). In various embodiments, the remote unit 105 performs positioning measurement, as described in greater detail below, and sends a positioning report 127 to the LMF 147 for performing certain steps of the positioning calculations. In some embodiments, (e.g., in scenarios where a location server is not immediately available, the target UE is configured to perform the sidelink positioning techniques locally.

While FIG. 1 depicts components of a 5G RAN and a 5G core network, the described embodiments for performing sidelink timing-based positioning apply to other types of communication networks and RATs, including IEEE 802.11 variants, Global System for Mobile to Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station but it is replaceable by any other radio access node, e.g., gNB, ng-eNB, eNB, Base Station ("BS"), Access Point ("AP"), etc. Further, the operations are described mainly in the context of 5G NR. However, the proposed solutions/methods are also equally applicable to other mobile communication systems supporting performing sidelink timing-based positioning.

Table 1 lists various positioning performance requirements for different scenarios in an IIoT or indoor factory setting. For IIoT in Release 17 ("Rel-17"), certain positioning requirements are especially stringent with respect to accuracy, latency, and reliability.

The apparatuses, methods, and systems disclosed herein are intended to enable sidelink timing-based positioning to be implemented with high accuracy, low latency, and high reliability.

TABLE 1

IIoT Positioning Performance Requirements

| Scenario | Horizontal accuracy | Vertical accuracy | Availability | Latency for position estimation of UE | UE Speed | Corresponding Positioning Service Level |
|---|---|---|---|---|---|---|
| Mobile control panels with safety functions (non-danger zones) | <5 m | <3 m | 90% | <5 s | N/A | Service Level 2 |
| Process automation - plant asset management | <1 m | <3 m | 90% | <2 s | <30 km/h | Service Level 3 |
| Flexible, modular assembly area in smart factories (for tracking of tools at the work-place location) | <1 m (relative positioning) | N/A | 99% | 1 s | <30 km/h | Service Level 3 |
| Augmented reality in smart factories | <1 m | <3 m | 99% | <15 ms | <10 km/h | Service Level 4 |
| Mobile control panels with safety functions in smart factories (within factory danger zones) | <1 m | <3 m | 99.9% | <1 s | N/A | Service Level 4 |
| Flexible, modular assembly area in smart factories (for autonomous vehicles, only for monitoring proposes) | <50 cm | <3 m | 99% | 1 s | <30 km/h | Service Level 5 |
| Inbound logistics for manufacturing (for driving trajectories (if supported by further sensors like camera, GNSS, IMU) of indoor autonomous driving systems)) | <30 cm (if supported by further sensors like camera, GNSS, IMU) | <3 m | 99.9% | 10 ms | <30 km/h | Service Level 6 |
| Inbound logistics for manufacturing (for storage of goods) | <20 cm | <20 cm | 99% | <1 s | <30 km/h | Service Level 7 |

The present disclosure describes mechanisms to perform sidelink timing-based positioning. Beneficially, time-difference-based measurements and location estimation facilitate high resolution in terms of accuracy for a target UE. Furthermore, enabling TDoA measurements and locations estimation for both anchor UE and non-anchor UE configurations facilitates high accuracy positioning in out-of-coverage scenarios may be especially beneficial for public safety and V2X scenarios.

Other technologies disclosed herein may be used to enable a target UE to autonomously perform round trip time (RTT) measurements for TX-RX distance/range computation using multiple beams between multiple pairs of UEs in sidelink. The disclosed RTT measurements for TX-RX distance computation may be readily configured, require no network assistance, and be applied for Mode 2 SL operations. Moreover, multiple SL beams can be exploited to perform accurate RTT measurements in a unicast scenario, while RTT measurements from multiple UEs can also enable mapping of a target UE's immediate surroundings.

FIG. 2 depicts a NR protocol stack 200, in accordance with one or more embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC layer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a Clear Channel Assessment and/or Listen-Before-Talk ("CCA/LBT") procedure. In certain embodiments, the physical layer 220 may send a notification of UL Listen-Before-Talk ("LBT") failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP layer 240 and/or RRC layer 245. The SDAP layer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the AMF 215 of the core network (e.g., 5GC). NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (i.e., RAN node 210) and carries information over the wireless portion of the network.

The following RAT-dependent positioning techniques may be supported by the system 100:

DL-TDoA: The DL TDOA positioning method makes use of the DL RS Time Difference ("RSTD") (and optionally DL PRS RSRP of DL PRS RS Received Quality ("RSRQ")) of downlink signals received from multiple TPs, at the UE 205 (i.e., remote unit 105). The UE 205 measures the DL RSTD (and optionally DL PRS RSRP) of the received signals using assistance data received from the positioning server, and the resulting measurements are used along with other configuration information to locate the UE 205 in relation to the neighboring Transmission Points ("TPs").

DL-AoD: The DL Angle of Departure ("AoD") positioning method makes use of the measured DL PRS RSRP of downlink signals received from multiple TPs, at the UE 205. The UE 205 measures the DL PRS RSRP of the received signals using assistance data received from the positioning server, and the resulting measurements are used along with other configuration information to locate the UE 205 in relation to the neighboring TPs.

Multi-RTT: The Multiple-Round Trip Time ("Multi-RTT") positioning method makes use of the UE Receive-Transmit ("Rx-Tx") measurements and DL PRS RSRP of downlink signals received from multiple TRPs, measured by the UE 205 and the gNB Rx-Tx measurements (i.e., measured by RAN node 210) and UL SRS-RSRP at multiple TRPs of uplink signals transmitted from UE 205.

The UE 205 measures the UE Rx-Tx measurements (and optionally DL PRS RSRP of the received signals) using assistance data received from the positioning server, and the TRPs measure the gNB Rx-Tx measurements (and optionally UL SRS-RSRP of the received signals) using assistance data received from the positioning server. The measurements are used to determine the Round Trip Time ("RTT") at the positioning server which are used to estimate the location of the UE 205.

E-CID/NR E-CID: Enhanced Cell ID (CID) positioning method, the position of a UE 205 is estimated with the knowledge of its serving ng-eNB, gNB and cell and is based on LTE signals. The information about the serving ng-eNB, gNB and cell may be obtained by paging, registration, or other methods. NR Enhanced Cell ID (NR E CID) positioning refers to techniques which use additional UE measurements and/or NR radio resource and other measurements to improve the UE location estimate using NR signals.

Although NR E-CID positioning may utilize some of the same measurements as the measurement control system in the RRC protocol, the UE 205 generally is not expected to make additional measurements for the sole purpose of positioning; i.e., the positioning procedures do not supply a measurement configuration or measurement control message, and the UE 205 reports the measurements that it has available rather than being required to take additional measurement actions.

UL-TDoA: The UL TDOA positioning method makes use of the UL TDOA (and optionally UL SRS-RSRP) at multiple RPs of uplink signals transmitted from the UE 205. The RPs measure the UL TDOA (and optionally UL SRS-RSRP) of the received signals using assistance data received from the positioning server, and the resulting measurements are used along with other configuration information to estimate the location of the UE 205.

UL-AoA: The UL Angle of Arrival ("AoA") positioning method makes use of the measured azimuth and the zenith angles of arrival at multiple RPs of uplink signals transmitted from the UE 205. The RPs measure A-AoA and Z-AoA of the received signals using assistance data received from the positioning server, and the resulting measurements are used along with other configuration information to estimate the location of the UE 205.

Some UE positioning methods supported in Release 16 ("Rel-16") of the 3GPP specifications are listed in Table 2. The separate positioning techniques as indicated in Table 2 may be currently configured and performed based on the requirements of the LMF and/or UE capabilities. Note that Table 2 includes TBS positioning based on PRS signals, but only OTDOA based on LTE signals is supported. The E-CID includes Cell-ID for NR method. The Terrestrial Beacon System ("TBS") method refers to TBS positioning based on Metropolitan Beacon System ("MBS") signals.

Figure 3:
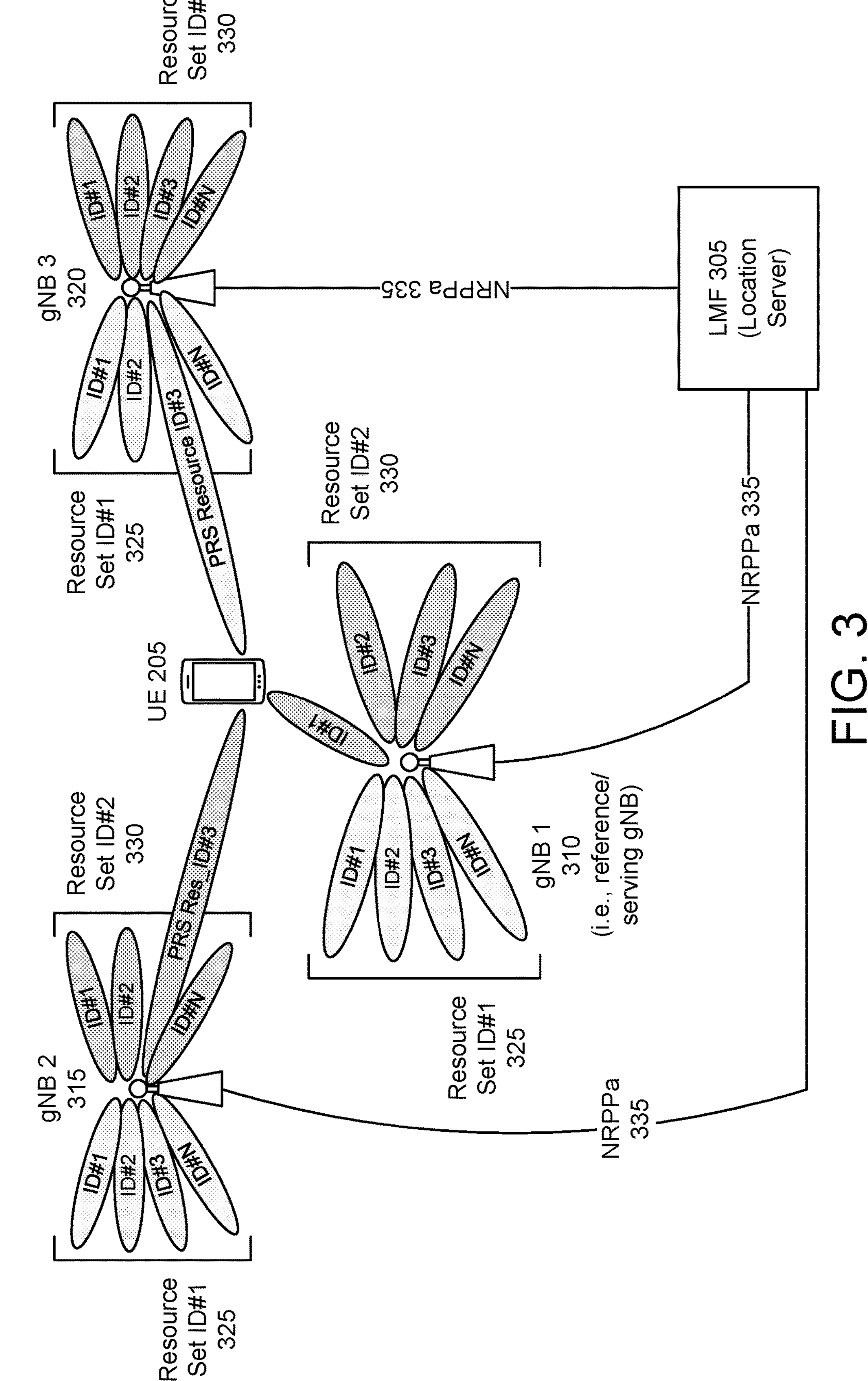
FIG. 3 is a block diagram illustrating NR beam-based positioning, in accordance with one or more embodiments of the disclosure.

The transmission of Positioning Reference Signals ("PRS") enables the UE 205 to perform UE positioning-related measurements to enable the computation of a UE's location estimate and are configured per Transmission Reception Point ("TRP"), where a TRP may transmit one or more beams. FIG. 3 depicts a system 300 for NR beam-based positioning. According to Rel-16, the PRS can be transmitted by different base stations (serving and neighboring) using narrow beams over Frequency Range #1 Between ("FR1", i.e., frequencies from 410 MHz to 7125 MHz) and Frequency Range #2 ("FR2", i.e., frequencies from 24.25 GHz to 52.6 GHz), which is relatively different when compared to LTE where the PRS was transmitted across the whole cell.

As illustrated in FIG. 3, a UE 205 may receive PRS from a first gNB ("gNB #1) 310 which is a serving gNB, and also from a neighboring second gNB ("gNB #2) 315, and a neighboring third gNB ("gNB #3) 320. Here, the PRS can be locally associated with a PRS Resource ID and Resource Set ID for a base station (i.e., TRP). In the depicted embodiments, each gNB 310, 315, 320 is configured with a first Resource Set ID 325 and a second Resource Set ID 330. As depicted, the UE 205 receives PRS on transmission beams; here, receiving PRS from the gNB #1 310 on PRS Resource ID #1 from the second Resource Set ID 330, receiving PRS from the gNB #2 315 on PSR Resource ID #3 from the second Resource Set ID 330, and receiving PRS from the gNB #3 320 on PRS Resource ID #3 from the first Resource Set ID 325. Within 5G RAN, an NR positioning protocol A ("NRPPa") 335 uses the services provided by a New Generation ("NG") application protocol ("NGAP"). An NRPPa message 335 is carried inside an NGAP message. The LMF 305 is connected to the NG-RAN node through the AMF 143. The NG-RAN node as a base unit 121 may control several TRPs. Both split NG-RAN architectures i.e., Centralized Unit ("CU")/Distributed Unit ("DU"), and non-split NG-RAN architectures are supported. A more detailed description of an NRPPa can be found in 3GPP TS 38.455.

Table 2 lists positioning techniques supported in Release 16 ("Rel-16") of the 3GPP specifications. Note that Table 2 includes TBS positioning based on PRS signals, but in Rel-16 only OTDOA based on LTE signals is supported. The E-CID includes Cell-ID for NR method. The Terrestrial Beacon System ("TBS") method refers to TBS positioning based on Metropolitan Beacon System ("MBS") signals.

TABLE 2

| Supported Rel-16 UE positioning methods | | | | |
|---|---|---|---|---|
| Method | UE-based | UE-assisted, LMF-based | NG-RAN node assisted | Secure User Plane Location ("SUPL") |
| A-GNSS | Yes | Yes | No | Yes (UE-based and UE-assisted) |
| OTDOA | No | Yes | No | Yes (UE-assisted) |
| E-CID | No | Yes | Yes | Yes, for E-UTRA (UE-assisted) |
| Sensor | Yes | Yes | No | No |
| WLAN | Yes | Yes | No | Yes |
| Bluetooth | No | Yes | No | No |
| TBS | Yes | Yes | No | Yes (MBS) |
| DL-TDOA | Yes | Yes | No | No |
| DL-AoD | Yes | Yes | No | No |
| Multi-RTT | No | Yes | Yes | No |
| NR E-CID | No | Yes | FFS | No |
| UL-TDOA | No | No | Yes | No |
| UL-AoA | No | No | Yes | No |

Separate positioning techniques as indicated in Table 2 can be currently configured and performed based on the requirements of the LMF and UE capabilities. The transmission of Positioning Reference Signals (PRS) enable the UE to perform UE positioning-related measurements to enable the computation of a UE's location estimate and are configured per Transmission Reception Point (TRP), where a TRP may transmit one or more beams.

Table 3 lists RS-to-measurements mapping for each of the supported RAT-dependent positioning techniques at the UE.

UE positioning measurements such as Reference Signal Time Difference ("RSTD") and PRS RSRP measurements are made between beams as opposed to different cells as was the case in LTE. In addition, there are additional UL positioning methods for the network to exploit in order to compute the target UE's location. Table 3 lists the RS-to-measurements mapping required for each of the supported RAT-dependent positioning techniques at the UE.

TABLE 3

| UE Measurements to enable RAT-dependent positioning techniques | | |
|---|---|---|
| DL/UL Reference Signals | UE Measurements | To facilitate support of the following positioning techniques |
| Rel-16 DL PRS | DL RSTD | DL-TDOA |
| Rel-16 DL PRS | DL PRS RSRP | DL-TDOA, DL-AoD, Multi-RTT |
| Rel-16 DL PRS/Rel-16 SRS for positioning | UE Rx − Tx time difference | Multi-RTT |
| Rel. 15 SSB/CSI-RS for RRM | SS-RSRP(RSRP for RRM), SS-RSRQ(for RRM), CSI-RSRP (for RRM), CSI-RSRQ (for RRM), SS-RSRPB (for RRM) | E-CID |

Table 4 lists RS-to-measurements mapping for each of the supported RAT-dependent positioning techniques at the gNB. RAT-dependent positioning techniques involve the 3GPP RAT and core network entities to perform the position estimation of the UE, which are differentiated from RAT-independent positioning techniques which rely on GNSS, IMU sensor, WLAN and Bluetooth technologies for performing target device (UE) positioning.

TABLE 4

| gNB Measurements to enable RAT-dependent positioning techniques | | |
|---|---|---|
| DL/UL Reference Signals | gNB Measurements | To facilitate support of the following positioning techniques |
| Rel-16 SRS for positioning | UL RTOA | UL-TDOA |
| Rel-16 SRS for positioning | UL SRS-RSRP | UL-TDOA, UL-AoA, Multi-RTT |
| Rel-16 SRS for positioning, Rel-16 DL PRS | gNB Rx − Tx time difference | Multi-RTT |
| Rel-16 SRS for positioning, | A-AoA and Z-AoA | UL-AoA, Multi-RTT |

RAT-dependent positioning techniques involve the 3GPP RAT and core network entities to perform the position estimation of the UE, which are differentiated from RAT-independent positioning techniques which rely on Global Navigation Satellite System ("GNSS"), Inertial Measurement Unit ("IMU") sensor, WLAN and Bluetooth technologies for performing target device (i.e., UE) positioning.

PRS Design

For 3GPP Rel-16, a DL PRS Resource ID in a DL PRS Resource set is associated with a single beam transmitted from a single TRP (A TRP may transmit one or more beams). A DL PRS occasion is one instance of periodically repeated time windows (consecutive slot(s)) to where DL PRS is expected to be transmitted. With regards to QCL relations beyond Type-D of a DL PRS resource, support for such QCL relations may include one or more of the following options:

Option 1: QCL-TypeC from an SSB from a TRP.

Option 2: QCL-TypeC from a DL PRS resource from a TRP.

Option 3: QCL-TypeA from a DL PRS resource from TRP.

Option 4: QCL-TypeC from a CSI-RS resource from a TRP.

Option 5: QCL-TypeA from a CSI-RS resource from a TRP.

Option 6: No QCL relation beyond Type-D is supported.

Note that QCL-TypeA refers to Doppler shift, Doppler spread, average delay, delay spread; QCL-TypeB refers to Doppler shift, Doppler spread'; QCL-TypeC refers to Average delay, Doppler shift; and QCL-TypeD refers to Spatial Rx parameter.

For a DL PRS resource, QCL-TypeC from an SSB from a TRP (Option 1) is supported. An ID is defined that can be associated with multiple DL PRS Resource Sets associated with a single TRP. An ID is defined that can be associated with multiple DL PRS Resource Sets associated with a single TRP. This ID can be used along with a DL PRS Resource Set ID and a DL PRS Resources ID to uniquely identify a DL PRS Resource. Name can be defined by RAN2. Each TRP should only be associated with one such ID.

DL PRS Resource IDs are locally defined within DL PRS Resource Set. DL PRS Resource Set IDs are locally defined within TRP. The time duration spanned by one DL PRS Resource set containing repeated DL PRS Resources should not exceed DL-PRS-Periodicity. Parameter DL-PRS-ResourceRepetitionFactor is configured for a DL PRS Resource Set and controls how many times each DL-PRS Resource is repeated for a single instance of the DL-PRS Resource Set. Supported values include: 1, 2, 4, 6, 8, 16, 32.

In some implementations, signaling may be defined to support any RAT dependent positioning technique including hybrid RAT dependent positioning solutions.

As related to NR positioning, the term "positioning frequency layer" refers to a collection of DL PRS Resource Sets across one or more TRPs which have: the same SCS and CP type; the same center frequency; the same point-A; all DL PRS Resources of the DL PRS Resource Set have the same bandwidth; and/or all DL PRS Resource Sets belonging to the same Positioning Frequency Layer have the same value of DL PRS Bandwidth and Start PRB.

A duration of DL PRS symbols in units of ms may be defined such that a UE can process every T ms assuming 272 PRB allocation is a UE capability.

Measurement and Report Configuration

UE measurements which are applicable to DL-based positioning techniques are discussed below. For a conceptual overview, the assistance data configurations (see FIG. 9) and measurement information (see FIG. 10) are provided for each of the supported positioning techniques.

FIG. 4 depicts an example of DL-TDOA assistance data 400 including a NR-DL-TDOA-ProvideAssistanceData information element ("IE") that may be used by the location server to provide assistance data to enable UE-assisted and UE-based NR downlink TDOA. It may also be used to provide NR DL TDOA positioning specific error reason. However, as depicted, the NR-DL-TDOA-ProvideAssistanceData IE does not provide assistance data specific to SL timing-based positioning such as the SL-TDOA or SL-RTT techniques disclosed herein. Accordingly, to implement the various embodiments of SL timing-based positioning disclosed herein, it may be useful to use a provide assistance data IE that includes information specific to SL timing-based positioning such as SL-TDOA or SL-RTT.

FIG. 5 shows an example of a DL-TDOA measurement report 500 including a NR-DL-TDOA-SignalMeasurementInformation IE that may be used by the target device to provide NR-DL TDOA measurements to the location server. The measurements are provided as a list of TRPs, where the first TRP in the list is used as reference TRP in case RSTD measurements are reported. The first TRP in the list may or may not be the reference TRP indicated in the NR-DL-PRS-AssistanceData. Furthermore, the target device selects a reference resource per TRP, and compiles the measurements per TRP based on the selected reference resource. However, as depicted, the NR-DL-TDOA-SignalMeasurementInformation IE does not provide time difference of arrival signal measurement information specific to SL timing-based positioning such as SL-TDOA or SL-RTT disclosed herein. Accordingly, to implement the various embodiments of SL timing-based positioning disclosed herein, it may be useful to use a TDOA-SignalMeasurementInformation IE that includes information specific to SL timing-based positioning such as SL-TDOA or SL-RTT.

Further details about the types of information that may be beneficially included are described below with respect to tables 6 and 7 for SL-TDOA based positioning and table 9 for SL-RTT based positioning.

RAT-dependent Positioning Measurements

Table 5 lists various DL Measurements used for DL-based positioning methods. The different DL measurements include DL PRS-RSRP, DL RSTD and UE Rx-Tx Time Difference required for the supported RAT-dependent positioning techniques are shown in Table 5.

TABLE 5

| DL Measurements required for DL-based positioning methods | |
|---|---|
| DL PRS reference signal received power (DL PRS-RSRP) | |
| Definition | DL PRS reference signal received power (DL PRS-RSRP), is defined as the linear average over the power contributions (in [W]) of the resource elements that carry DL PRS reference signals configured for RSRP measurements within the considered measurement frequency bandwidth.<br>For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency,<br>RRC_CONNECTED inter-frequency |
| DL reference signal time difference (DL RSTD) | |
| Definition | DL reference signal time difference (DL RSTD) is the DL relative timing difference between the positioning node j and the reference positioning node i, defined as $T_{SubframeRxj} - T_{SubframeRxi}$,<br>Where: $T_{SubframeRxj}$ is the time when the UE receives the start of one subframe from positioning node j; and $T_{SubframeRxi}$ is the time when the UE receives the |

TABLE 5-continued

| DL Measurements required for DL-based positioning methods | |
|---|---|
| | corresponding start of one subframe from positioning node i that is closest in time to the subframe received from positioning node j. Multiple DL PRS resources can be used to determine the start of one subframe from a positioning node. For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency RRC_CONNECTED inter-frequency |
| | UE Rx − Tx time difference |
| Definition | The UE Rx − Tx time difference is defined as $T_{UE-RX} - T_{UE-TX}$ Where: $T_{UE-RX}$ is the UE received timing of downlink subframe #i from a positioning node, defined by the first detected path in time; and $T_{UE-TX}$ is the UE transmit timing of uplink subframe #j that is closest in time to the subframe #i received from the positioning node. Multiple DL PRS resources can be used to determine the start of one subframe of the first arrival path of the positioning node. For frequency range 1, the reference point for $T_{UE-RX}$ measurement shall be the Rx antenna connector of the UE and the reference point for $T_{UE-TX}$ measurement shall be the Tx antenna connector of the UE. For frequency range 2, the reference point for $T_{UE-RX}$ measurement shall be the Rx antenna of the UE and the reference point for $T_{UE-TX}$ measurement shall be the Tx antenna of the UE. |
| Applicable for | RRC_CONNECTED intra-frequency RRC_CONNECTED inter-frequency |

Certain measurement configurations may also be specified, such as for example, Four pairs of DL RSTD measurements can be performed per pair of cells. Each measurement is performed between a different pair of DL PRS Resources/Resource Sets with a single reference timing.

Eight DL PRS RSRP measurements can be performed on different DL PRS resources from the same cell.

Sidelink Timing-based Positioning

The present disclosure provides various solutions for SL RAT-dependent positioning techniques related to timing-based methods. In one embodiment, a method to enable the configuration and signaling for SL time-difference-based positioning using a fixed reference and/or mobile reference for out-of-coverage, partial coverage, and in-coverage scenarios is described. Time-difference-based measurements and location estimation provide the highest resolution in terms of accuracy for a target UE. Enabling anchor UE and non-anchor UE configurations for high accuracy positioning in out-of-coverage scenarios is especially beneficial for public safety and V2X scenarios.

In certain embodiments, a technique for a target UE to autonomously perform round trip time (RTT) measurements for TX-RX distance/range computation using multiple beams between multiple pairs of UEs in sidelink is described. In various embodiments, RTT measurements for TX-RX distance computation can be configured and require no network assistance and can be applicable for Mode 2 SL operations. Multiple SL beams can be exploited to perform accurate RTT measurements in a unicast scenario, while RTT measurements from multiple UEs can also enable mapping of a target UE's immediate surroundings.

In some communication networks, location estimation of a target UE using TDOA requires at least 3 anchor nodes with a known location, where at least one of these nodes acts as a reference node. One or more embodiments of the present disclosure describe different SL-TDOA location estimation scenarios involving a fixed reference (Embodiment 1) and a mobile reference node (Embodiment 2). Embodiments 1-5 or portions thereof can be implemented in combination with each other to achieve an improved location accuracy estimate.

Moreover, various aspects of embodiments 1-5 may be implemented in combination with each other for certain reasons, such as for example, to achieve an improved location accuracy estimate. Additionally, embodiments disclosed in U.S. Provisional Patent Application No. 63/063,854 titled "Sidelink Angular-Based And SL RRM-Based Positioning" and/or U.S. Provisional Patent Application No. 63/063,824 titled "Apparatuses, Methods, And System For SL PRS Transmission Methodology which are incorporated herein by reference may be implemented in combination with the embodiments in this disclosure.

Embodiment 1—SL-TDOA Using a Fixed Reference Node

Figure 6:
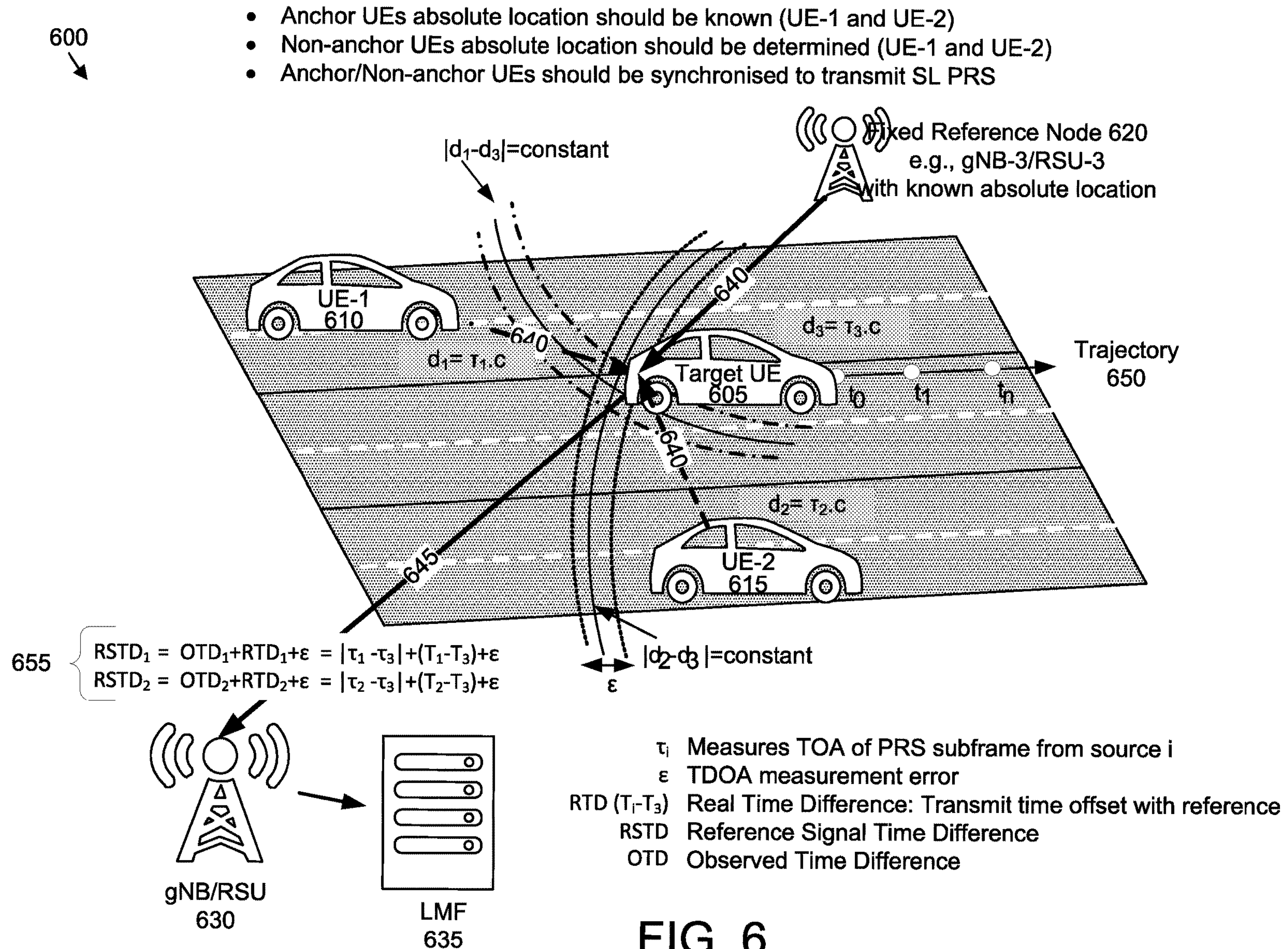
FIG. 6 is a diagram illustrating an example scenario with a fixed reference node and two additional UEs for sidelink SL-time-difference-of-arrival ("TDOA") positioning of a target UE, in accordance with one or more embodiments of the disclosure.

FIG. 6 is a diagram illustrating an example scenario 600 for a sidelink SL-time-difference-of-arrival ("TDOA") positioning technique fixed reference node 620 and two additional SL UEs referred to as UE-1 610 and UE-2 615) for sidelink SL-time-difference-of-arrival ("TDOA") positioning of a target UE 605, in accordance with one or more embodiments of the disclosure.

In the example scenario 600, a target UE 605 may communicate with an LMF 635, e.g., via a gNB or RSU 630 and with two or more additional UEs 610 and 615. It may be noted that as used in the disclosure the LMF 635 may be implemented as a standalone core network entity or included in a location server. In various embodiments, the LMF 635 configures the SL target UE 605 with the SL PRS configuration corresponding to a TRP originating from at least one fixed anchor reference node 620 such as a serving/neighboring base station (gNB), roadside unit (RSU) or location measurement unit (LMU), vulnerable road user (VRU), where this TRP may be based on the Uu or SL interface. Although two additional UEs are depicted as mobile UEs in FIG. 6, TRPs from two or more additional nodes (e.g., two or more additional UEs) may originate from one or more of the following:

Mobile anchor nodes with a known absolute 2D/3D location, heading and/or velocity;

Fixed anchor nodes with a known absolute 2D/3D location; and

Mobile non-anchor nodes with an unknown absolute location, heading, and/or velocity where the mobile non-anchor nodes are identified and are then transformed to anchor nodes by determining their respective absolute locations.

For example, in certain embodiments consistent with example scenario 600, the serving base station 630 (e.g., gNB or RSU) can trigger the request for a location report 645 using RRC signaling (e.g., using a LocationInfo message IE) of at least two non-anchor SL nodes in the immediate vicinity of the target UE 605 (e.g., UE-1 610, UE-2 615. The location report 645 for non-anchor nodes provides their location using RAT-independent techniques such as GNSS or IMU-based positioning techniques, thereby enabling them to serve as anchor nodes for SL timing-based positioning. The serving gNB 630 may share that location information with the LMF 635 via an appropriate interface, e.g., NRPPa before transmitting the SL PRS configuration of the updated three nodes that serve as anchor nodes.

In another example, in accordance with one or more the serving base station 630 (e.g., gNB) may estimate the location of two or more non-anchor SL nodes (e.g., UE-1 610, UE-2 615) in the immediate vicinity of the target UE 605 based on gNB measurement RAT-dependent positioning techniques (e.g., uplink SRS transmission from the non-anchor SL node as shown in Table 4).

A serving gNB may share that location information with the LMF 635 via the NRPPa interface before transmitting the SL PRS configuration of updated three anchor nodes.

Other scenarios consistent with one or more embodiments of the present disclosure may include:

- One mobile anchor node with a known absolute 2D/3D location, heading and/or velocity and another fixed anchor node with a known absolute 2D/3D location;
- One mobile anchor node with a known absolute 2D/3D location, heading and/or velocity and another mobile non-anchor node with an unknown absolute location, heading, velocity; and
- One fixed anchor node with a known absolute 2D/3D location and another mobile non-anchor node with an unknown absolute location, heading, velocity
- For UE-assisted positioning, the LMF 635 uses 2D (x, y) coordinates of the anchor nodes transmitting SL PRS as well as the transmit time offsets in order to localize the target UE 605.

Table 6 shows the respective SL PRS configuration parameters transmitted by the LMF 635 for use at the target UE 605.

TABLE 6

SL-TDOA Configuration parameters from LMF to UE

| Configuration Parameter | SL UE-assisted | SL UE-based |
|---|---|---|
| Physical cell IDs (PCIs), global cell IDs (GCIs), Source-UE ID, Destination UE-ID, RSU IDs, Zone IDs, SL-TRP ID/SL-PRS ID/SL-PRS resource set ID of candidate NR TRPs for measurement | Yes | Yes |
| Timing relative to the serving fixed (reference) TRP of candidate NR TRPs from gNB/RSUs/SL-UEs | Yes | Yes |
| SL-PRS configuration (e.g., consisting of SL-PRS resource set comprising at least one SL-PRS resource; quasi-collocation relation information (QCL reference RS, QCL type/property of SL-PRS resource) of candidate NR TRPs from gNB/RSUs/SL-UEs at times ($t_0$, $t_1$, . . . , $t_n$) | Yes | Yes |
| SL-SSB information of the SL TRPs (the time/frequency occupancy of SL-SLSS) | Yes | Yes |
| Spatial direction information (e.g., azimuth, elevation) etc.) of the SL-PRS Resources of the SL TRPs served by the gNB/RSU/SL UE | No | Yes |
| Geographical coordinates of the TRPs served by the gNB/RSU/SL UE (include a transmission reference location for each SL-PRS Resource ID, reference location for the transmitting antenna of the fixed reference TRP, relative locations for transmitting antennas of other Uu/SL TRPs) | No | Yes |
| Fine Timing relative to the fixed reference TRP of candidate NR TRPs (Expected RSTD value) | No | Yes |

These parameters may be further differentiated based on the whether these parameters are required for the LMF 635 (UE-assisted) or the two or more additional SL UEs 610, 615 (UE-based) to perform the location estimation.

The SL TRP ID or SL-PRS ID or SL-PRS resource set ID describes the unique SL-PRS resource/resource set that has been transmitted by the anchor or non-anchor node. The RSU ID will provide additional information in terms of identifying which RSU would be transmitting SL, while the Zone ID provides complimentary assistance information for localizing the target UE using the V2X zone concept where a cell is partitioned into rectangular grids based on a geographic reference.

Although various combinations of fixed and/or mobile nodes that are anchor and/or non-anchor nodes may be used in accordance with certain embodiments of the disclosure, the example scenario 600 illustrates an example of a fixed reference node 620 and two mobile anchor/non-anchor UEs (UE-1 610 and UE-2 615) for SL-TDOA positioning.

In various implementations, it may be noted that the target UE 605 performs at least two different RSTD measurements 655 with respect to the reference node (gNB-3/RSU-3) which involve real time differences ("RTD"), observed time differences ("OTD") ($\tau_1$-$\tau_3$), transmit time offsets based on synchronization of SL PRS transmitters (($\tau_1$-$\tau_3$)=0 for perfect synchronization) and measurement errors c for example as depicted in the scenario 600 illustrated in FIG. 6.

Table 7 below shows an example of reported measurements by the target UE 605.

TABLE 7

SL-TDOA measurement report parameters from UE to LMF

| Configuration Parameter | SL UE-assisted | SL UE-based |
|---|---|---|
| Latitude/Longitude/Altitude, together with uncertainty shape from TS23.032 | Yes | Yes |
| PCI, GCI, Source UE-ID, Destination UE-ID, SL TRP ID/SL-PRS ID/SL-PRS resource set ID and Zone ID for each measurement | Yes | No |
| SL PRS-RSRP measurement | Yes | Yes |
| Time stamp of the measurements | Yes | Yes |
| Time stamp of location estimate | No | Yes |
| Quality of Measurement, Measurement resolution | Yes | No |
| Horizontal/Vertical Location Estimate Accuracy | Yes | No |

In certain example implementations, the LMF 635 may provide the target UE 605 with a periodic SL PRS configuration at specific time instances ($t_0, t_1, \ldots, t_n$) corresponding to the trajectory 650 of the target UE 605. A set of RSTD measurements can then be performed at each of the configured time instances. The periodicity and length of the SL PRS time interval measurement can be configured by the LMF 635.

In some example implementations, the target UE 605 may also provide an additional non-reference RSTD measurement between nodes 1 (UE-1 610) and nodes 2 (UE-2 615), if configured, to assist the LMF 635 in improving the location estimation accuracy. This provides an additional hyperbolic estimate, resulting in 3 unique RSTD measurements for improved 2D location accuracy.

In various embodiments, the target UE 605, may provide $$\frac{N(N-1)}{2}$$

distinct RSTD measurements, where N is the number of identified and configured anchor nodes, which can transmit SL PRS 640. In general, for 3D location estimation, the TDOA resolution can be solved with five or more anchor nodes and some implementations enable the LMF 635 (network) to configure more anchor nodes depending on the type of location estimate, 2D or 3D, and the required accuracy. A tradeoff for increased accuracy through more measurements for more anchor nodes in various implementations involves an increase in SL PRS scheduling complexity as well as the processes involved with ensuring all nodes are time synchronized as the number of anchor nodes are scaled.

When the SL positioning configuration (or SL positioning request) is transmitted by the LMF 635, it may also include the Source L2 ID of the target UE and then the Destination L2 ID is transmitted for Anchor UEs to transmit the PRS 640. The PRS resource set is configured per Destination L2 ID. The target UE's report 645 to the LMF 635 includes the Source L2 ID and the Destination L2 ID for which the positioning request was transmitted. Furthermore, the report 645 from the target UE 605 may multiplex multiple reports from multiple source/destination L2 IDs.

Embodiment 2—SL-TDOA Using a Mobile Reference Node

Figure 7:
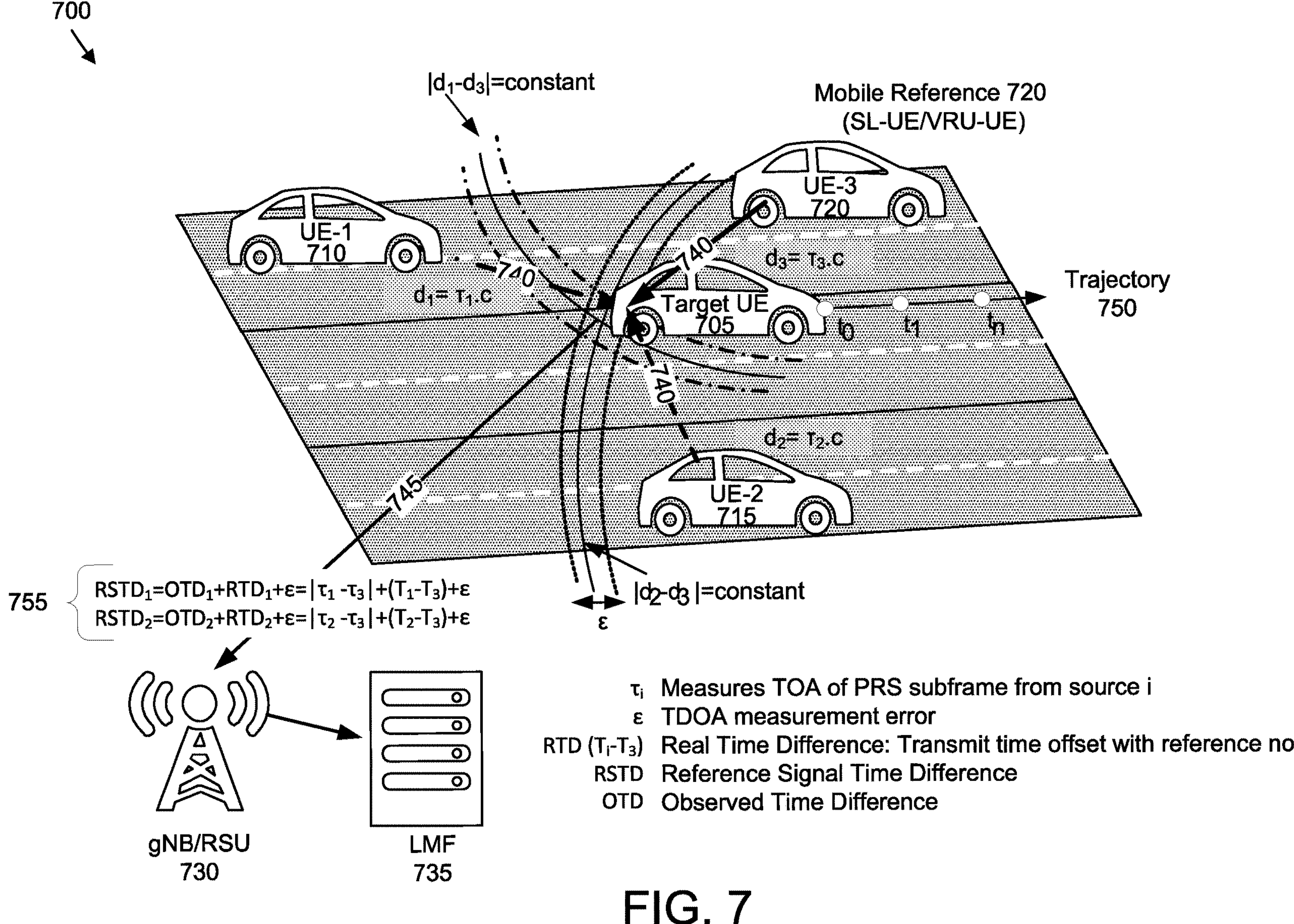
FIG. 7 is a diagram illustrating an example scenario with a mobile reference node and two additional UEs for SL-TDOA positioning of a target UE, in accordance with one or more embodiments of the disclosure.

FIG. 7 is a diagram illustrating an example scenario 700 with a mobile reference node 720 and two or more additional UEs UE-1 710 and UE-2 715 for SL-TDOA positioning of a target UE 705, in accordance with one or more embodiments of the disclosure;

Embodiment 2 describes an SL-TDOA technique, to determine the location of the target UE 705 with respect to the mobile reference node 720. An LMF/V2X Application may trigger the V2X layer for positioning-related services and this may involve a group of UEs, where the target UE(s) are members within a group, while the remaining members may assume anchor node roles for performing SL-TDOA. Two scenarios in accordance with example scenario 700 are described as follows:

1) SL-TDOA with Mobile Anchor Nodes with Known Absolute Locations

An LMF/V2X application may trigger a positioning-related groupcast communication service with the V2X layer, where the V2X layer may assign member IDs to each of the group members. The V2X layer may assist the LMF 735 in providing the absolute locations of each of the anchor nodes. The LMF 735 configures the SL target UE 705 with the SL PRS configuration corresponding to a SL TRP originating from at least one mobile anchor reference node 720 such as UE-3 (or the mobile reference node may be a vulnerable road user ("VRU"). According to 13, the target UE performs at least two different RSTD measurements with respect to the mobile reference node (UE-3) which encompasses the RTD measurements and the errors arising from synchronization and clock errors.

2) SL-TDOA with Mobile Non-Anchor Nodes with Unknown Absolute Locations

The LMF/V2X application may trigger a positioning-related groupcast communication service with the V2X layer, where the V2X layer may assign member IDs to each of the group members. The V2X layer may assist the LMF in providing the relative locations of each of the non-anchor nodes with respect to the reference anchor node.

Mode 1: The LMF configures the SL target UE with the SL PRS configuration corresponding to a SL TRP originating from one mobile non-anchor reference node 720 such as UE-3 (shown in FIG. 7) and other non-anchor UEs (UE-1 and UE-2); the UEs could be V2X users and/or vulnerable road users (VRUs).

Mode 2: The reference non-anchor node 720 configures the SL target UE 705 with the SL PRS configuration corresponding to a SL TRPs originating from all non-anchor nodes (UE-1 710, UE-2 715, and UE-3 720).

In various implementations, the target UE 705 performs at least two different RSTD measurements 755 with respect to the mobile reference node (UE-3) which involve real time differences ("RTD"), observed time differences ("OTD") ($\tau_1$-$\tau_3$), transmit time offsets based on synchronization of SL PRS transmitters (($\tau_1$-$\tau_3$)=0 for perfect synchronization) and measurement errors ε for example as depicted in the scenario 700 illustrated in FIG. 7. In various implementations, the target UE 705 transmits a report 745 of the RSTD measurements 755 via the serving based station (e.g., gNB or RSU 730) to the LMF 735 for determining the estimated location of the target UE 705. In certain example implementations, the SL PRS received by the target UE are configured and measured at a plurality of time instances corresponding to points along a trajectory 750 of the target UE 705.

Embodiment 3: SL-TDOA Synchronization

In a perfectly synchronized network, the RTD parameter consisting of the transmit time offset would be zero. However, in practice the LMF 735 use this RTD information in order to compute the target UE's 705 final location estimate. In some embodiments of SL-TDOA positioning technique implementations, tight nano-second synchronization between the anchor/non-anchor nodes transmitting SL PRS 740 may be very important.

According to Embodiments 1 and 2, the fixed and mobile reference node 620, 720 together with the mobile anchor/non-anchor nodes (e.g., 710, 715) transmitting the SL PRS 740 are configured to be synchronized with a common clock, e.g., preferably based on GNSS time. In the case of Embodiment 1 with a fixed reference node 620, the mobile anchor/non-anchor nodes (e.g., 610, 615) may also have the option to synchronize with the base station 630. In some examples, the common synchronization source may be configured based on a priority index and network coverage. The status of network coverage may be in-coverage, partial coverage, out-of-coverage for the reference nodes 620, 720 and/or mobile anchor/non-anchor nodes 610, 615, 710, 715. Table 8 below shows exemplary details related to the priority-to-synchronization-source mapping to be implemented among UEs involved in performing SL-TDOA/SL timing-based positioning methods.

According to Table 8 shown below, GNSS is prioritized as a synchronization source when compared to Base station synchronization due the tight synchronization requirements required for SL timing-based positioning methods. Base Station may comprise of a centralized radio access node such as an eNB/gNB. Additionally, Base Station source synchronization may only be considered while in-coverage or partial coverage.

TABLE 8

Priority Index Mapping to Synchronization Sources

| GNSS- based Synchronization (Priority 1) | | Base station- based Synchronization (Priority 2) | |
|---|---|---|---|
| Priority 1.1 | GNSS | Priority 2.1 | Base Station |
| Priority 1.2 | Fixed and mobile reference nodes directly synchronized to GNSS | Priority 2.2 | Fixed and mobile reference nodes directly synchronized to Base Station |
| Priority 1.3 | Fixed and mobile reference nodes indirectly synchronized to GNSS | Priority 2.3 | Fixed and mobile reference nodes indirectly synchronized to Base Station |
| Priority 1.4 | Base Station | Priority 2.4 | GNSS |
| Priority 1.5 | Fixed and mobile reference nodes directly synchronized to Base Station | Priority 2.5 | Fixed and mobile reference nodes directly synchronized to GNSS |
| Priority 1.6 | Fixed and mobile reference nodes indirectly synchronized to Base Station | Priority 2.6 | Fixed and mobile reference nodes indirectly synchronized to GNSS |

Furthermore, nodes transmitting SL PRS such as for example nodes 610, 615, 620, 710, 715, 720 are configured to report the transmit time to the LMF periodically assisting the LMF to compensate the RTD offset, especially for Mode 1 operations. In the case of UE-based positioning for Mode 2 scenarios, the RTD offset may be calculated by the target UE 605, 705 based on a SL PRS transmit timestamp associated with the SL PRS transmission.

Embodiment 4: SL-RTT

Figure 8:
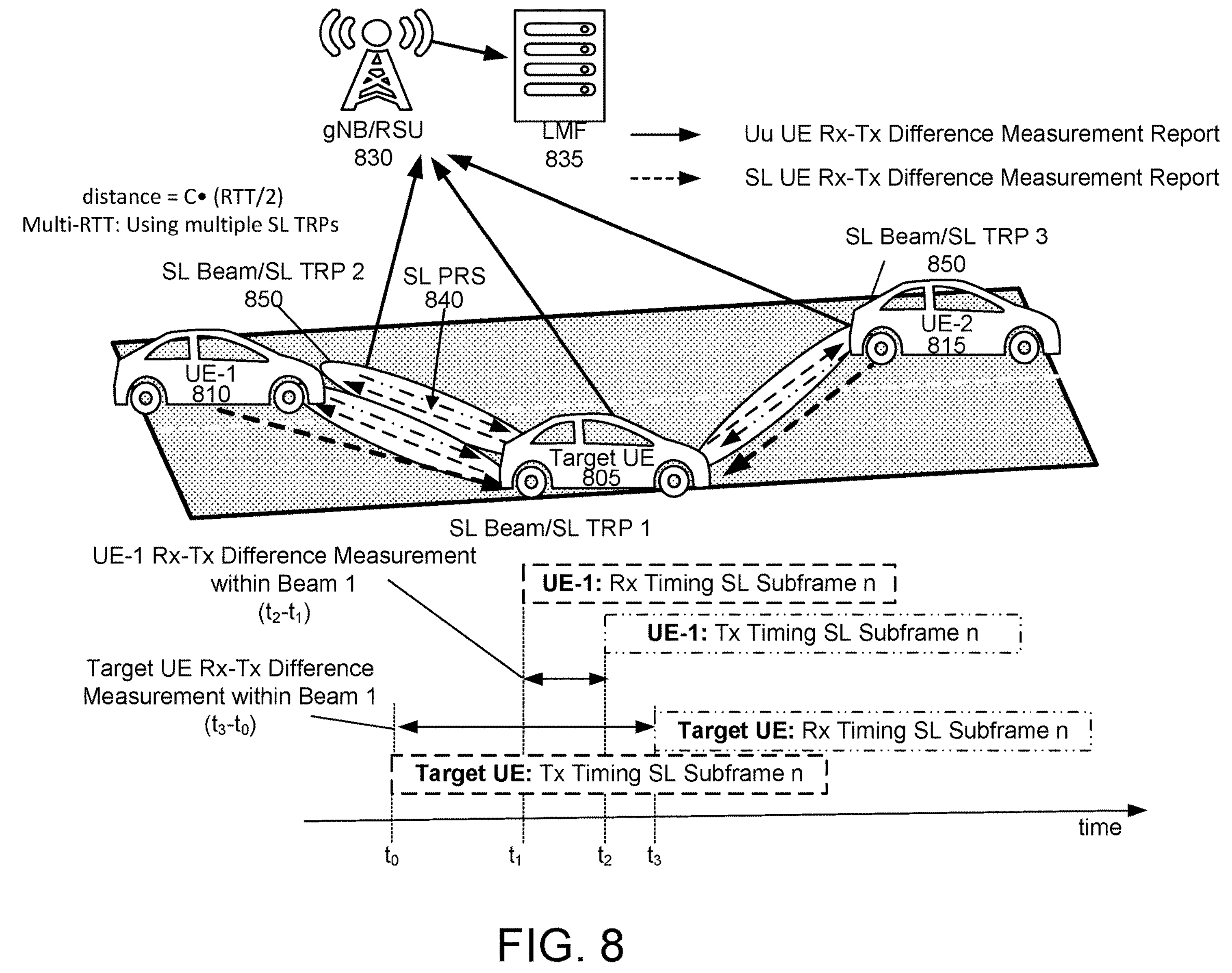
FIG. 8 is a diagram illustrating an example scenario of SL-round-trip-time ("RTT") positioning of target UE using multiple beams with multiple UEs, in accordance with one or more embodiments of the disclosure.

FIG. 8 is a diagram illustrating an example scenario 800 of SL-round-trip-time ("RTT") positioning of target UE 805 using multiple beams with multiple UEs 810, 815, in to accordance with one or more embodiments of the disclosure;

The round-trip time (RTT) of the SL-PRS 840 that form each SL beam 850 may also be used to determine the absolute and relative location of a SL UE with respect to another UE. The advantage of this technique is that the distance/range can be computed using only one anchor node 810 and a target UE 805. This disclosure describes example embodiments with additional enhancements for SL-RTT to enhance to the overall location estimation accuracy for the target UE 805.

For simplicity, FIG. 8 depicts performing the SL-RTT positioning technique using a single beam 850 for each SL TRP which can also be extended to be configured to be performed using multiple beams and multiple anchor nodes. It can be observed that UE-1 810 and UE-2 acts as reference nodes with respect to the target UE 805 for the SL-RTT procedure.

An LMF/V2X application may trigger a positioning-related unicast communication session with the V2X layer to initiate the SL-RTT procedure with the target UE 805. The SL-RTT procedure is similar for both SL Mode 1 and Mode 2 operations, but how the SL-PRS configuration and reporting is performed may differ for different Modes. The trigger may be event-based, aperiodic or periodic based on the application requirements. In Mode 1, SL UEs are assisted by the gNB and they use dedicated radio resources for data transmission. In Mode 2, the SL UEs randomly select the radio resources from a resource pool that was previously sent by the gNB.

Mode 1: In various embodiments, the LMF 835 configures UE-1 810, UE-2 815 and target UE with the SL-PRS configuration. UE-1 and UE-2 may be RSUs/SL-UEs or VRUs. The one or more additional nodes UE-1 810, UE-2 815 and the target UE 805 report their respective UE Rx-Tx difference measurements to the LMF per beam/SL TRP, which is mainly applicable for UE-assisted positioning. The LMF 835 may compute the distance based on $$c\left(\frac{SL-RTT}{2}\right),$$

where c is the speed of light and SL-R11 is based on the reported round-trip time.

Mode 2: In some example implementations, the LMF 835 may transfer the SL-PRS configuration to the gNB 830, to be broadcasted using positioning system information. In certain implementations, a default SL-PRS configuration can be pre-configured to the UEs. In such implementations, the UE-1 810, UE-2 815 and target UE 805 use the stored, preconfigured, or broadcasted SL PRS configuration to perform SL-RTT positioning. The UEs UE-1 810 and UE-2 815 report their respective UE Rx-Tx difference measurement per beam/SL TRP to the target UE 805 for UE-based positioning. Tables 9 and 10 below list certain SL PRS configuration parameters for each of the UEs and corresponding reporting parameters and indicate whether such parameters are used respectively for SL positioning where the UE is assisted by the LMF to perform the positioning or for SL UE-based positioning where the target UE calculates its estimated location using an SL RTT positioning technique.

TABLE 9

SL-RTT Configuration parameters from LMF to UE/preconfigured in UE

| Configuration Parameter | SL UE-assisted | SL UE-based |
|---|---|---|
| PCI, GCI, RSU ID, Source UE-ID, Destination UE-ID, Zone ID, SL TRP ID/SL-PRS ID of candidate NR SL-TRPs from gNBs/RSUs/SL-UEs/VRUs | Yes | Yes |
| SL-PRS configuration (e.g., consisting of SL-PRS resource set comprising at least one SL-PRS resource; quasi-collocation relation information (QCL reference RS, QCL type/property of SL-PRS resource) of candidate NR TRPs from gNBs/RSUs/SL-UEs/VRUs times ($t_0$, $t_1$, . . . , $t_n$) | Yes | Yes |
| Timing relative to the serving (reference) TRP of candidate NR TRPs/RSUs/SL-UEs/VRUs | Yes | No |
| SL-SSB information of the NR TRPs from gNBs/RSUs/SL-UEs/VRUs | Yes | Yes |

TABLE 10

SL-RTT Reporting Parameters to LMF/Target UE

| Configuration Parameter | SL UE-assisted | SL UE-based |
|---|---|---|
| PCI, GCI, Source UE-ID, Source UE-ID, Destination UE-ID, Zone ID, SL-TRP ID/SL-PRS ID of each measurement from SL TRP | Yes | Yes |
| SL-PRS measurement | Yes | Yes |
| SL Rx − Tx Difference measurement | Yes | Yes |
| Timing stamp of measurement | Yes | Yes |
| Measurement Quality, Measurement resolution | Yes | Yes |

Embodiment 5: SL Positioning Capability Exchange Signaling

FIG. 9 is a diagram illustrating an example 900 of a capability signaling exchange for SL-TDOA and/or SL-RTT, in accordance with one or more embodiments of the disclosure. In various embodiments, prior to performing SL positioning, the Target UE 905 may receive a request 915 from an LMF 910 enquiring whether the target UE 905 to be localized has the required UE features necessary to perform SL-TDOA and/or SL-RTT positioning techniques. The Target UE may transmit a reply 920 that provides the LMF 910 with information about the Target UE's 905 SL-TDOA and/or SL-RTT capabilities.

FIG. 10 is a diagram illustrating an example 1000 of an assistance data signaling exchange for SL-TDOA and/or SL-RTT, in accordance with one or more embodiments of the disclosure. In various embodiments, prior to performing SL positioning, the Target UE 1005 may transmit a request 1015 to an LMF 1010 requesting SL-TDOA and/or SL-RTT assistance data. The Target UE receive transmit a reply 1020 from the LMF 1010 that provides the requested assistance data.

User Equipment

Figure 11:
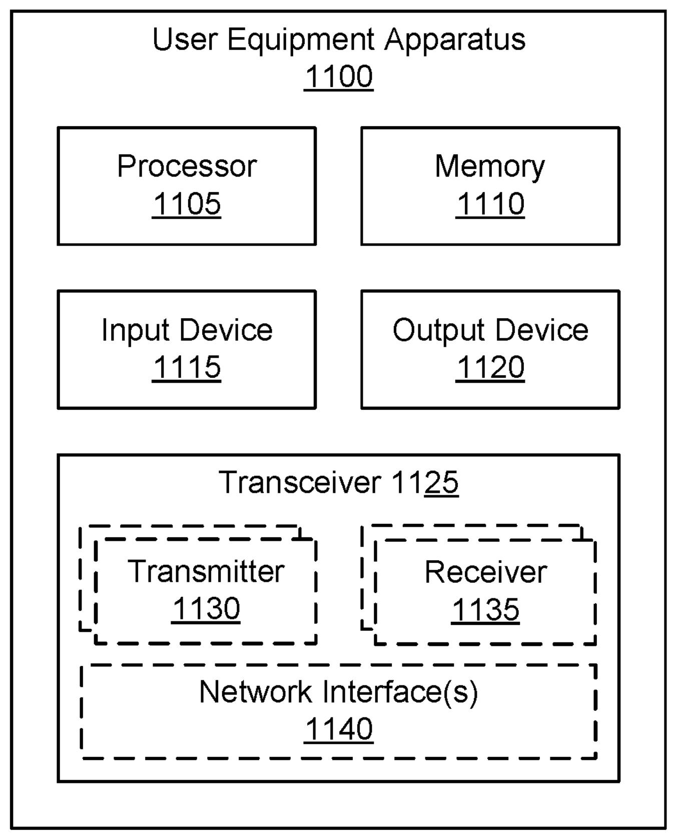
FIG. 11 is a block diagram illustrating a user equipment apparatus that may be used for sidelink timing-based positioning methods, in accordance with one or more embodiments of the disclosure.

FIG. 11 depicts a user equipment apparatus 1100 that may be used for sidelink timing-based positioning methods, in accordance with one or more embodiments of the disclosure. In various embodiments, the user equipment apparatus 1100 is used to implement one or more of the solutions described above. The user equipment apparatus 1100 may be one embodiment of the remote unit 105 and/or the UE, described above. Furthermore, the user equipment apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the user equipment apparatus 1100 may not include any input device 1115 and/or output device 1120. In various embodiments, the user equipment apparatus 1100 may include one or more of: the processor 1105, the memory 1110, and the transceiver 1125, and may not include the input device 1115 and/or the output device 1120.

The processor 1105, in one embodiment, may include any known controller capable of executing computer-readable instructions and/or capable of performing logical operations. For example, the processor 1105 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125.

In various embodiments, the processor 1105 controls the user equipment apparatus 1100 to implement UE behavior according to one or more of the above described embodiments.

The memory 1110, in one embodiment, is a computer readable storage medium. In some embodiments, the memory 1110 includes volatile computer storage media. For example, the memory 1110 may include a RAM, including dynamic RAM ("DRAM"), synchronous dynamic RAM ("SDRAM"), and/or static RAM ("SRAM"). In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to sidelink timing-based positioning methods. For example, the memory 1110 may store various parameters, configurations, policies, and the like as described above. In certain embodiments, the memory 1110 also stores program code and related data, such as an operating system or other controller algorithms operating on the apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, an LCD display, an LED display, an OLED display, a projector, or similar display device capable of outputting images, text, or the like to a user. As another, non-limiting, example, the output device 1120 may include a wearable display separate from, but communicatively coupled to, the rest of the user equipment apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all, or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 communicates with one or more network functions of a mobile communication network via one or more access networks. The transceiver 1125 operates under the control of the processor 1105 to transmit messages, data, and other signals and also to receive messages, data, and other signals. For example, the processor 1105 may selectively activate the transceiver 1125 (or portions thereof) at particular times in order to send and receive messages.

The transceiver 1125 includes at least transmitter 1130 and at least one receiver 1135. One or more transmitters 1130 may be used to provide UL communication signals to a base unit 121, such as the UL transmissions described herein. Similarly, one or more receivers 1135 may be used to receive DL communication signals from the base unit 121, as described herein. Although only one transmitter 1130 and one receiver 1135 are illustrated, the user equipment apparatus 1100 may have any suitable number of transmitters 1130 and receivers 1135. Further, the transmitter(s) 1130 and the receiver(s) 1135 may be any suitable type of transmitters and receivers.

In one embodiment, the transceiver 1125 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1125, transmitters 1130, and receivers 1135 may be implemented as physically separate components that access a shared hardware resource and/or software resource, such as for example, the network interface 1140.

In various embodiments, one or more transmitters 1130 and/or one or more receivers 1135 may be implemented and/or integrated into a single hardware component, such as a multi-transceiver chip, a system-on-a-chip, an ASIC, or other type of hardware component. In certain embodiments, one or more transmitters 1130 and/or one or more receivers 1135 may be implemented and/or integrated into a multi-chip module. In some embodiments, other components such as the network interface 1140 or other hardware components/circuits may be integrated with any number of transmitters 1130 and/or receivers 1135 into a single chip. In such embodiment, the transmitters 1130 and receivers 1135 may be logically configured as a transceiver 1125 that uses one more common control signals or as modular transmitters 1130 and receivers 1135 implemented in the same hardware chip or in a multi-chip module.

Network Equipment

Figure 12:
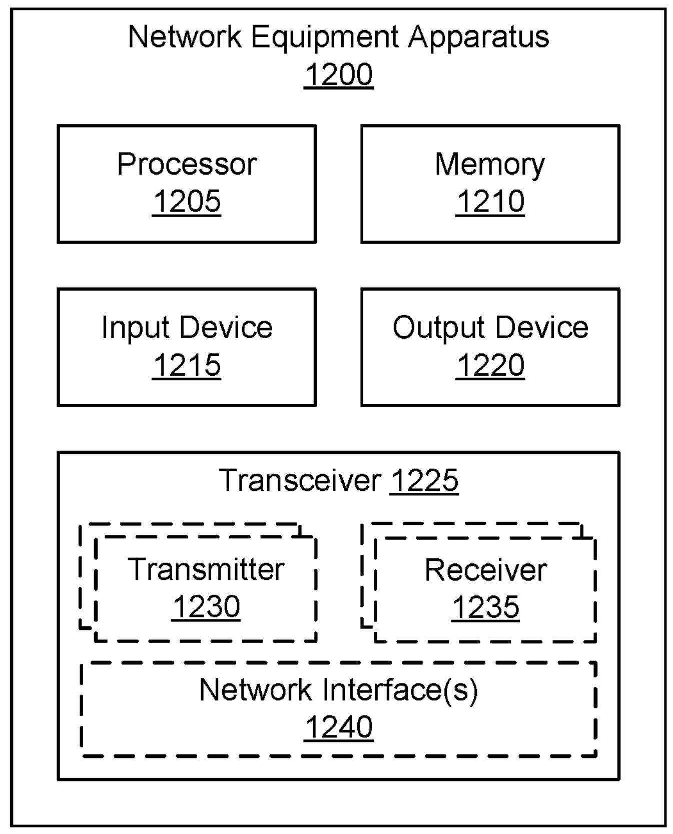
FIG. 12 is a block diagram illustrating a network equipment apparatus that may be used for sidelink timing-based positioning methods, in accordance with one or more embodiments of the disclosure.

FIG. 12 depicts a network equipment apparatus 1200 that may be used for sidelink timing-based positioning methods, in accordance with one or more embodiments of the disclosure. The network equipment apparatus 1200 may be one embodiment of the base unit 121, RAN node, LMF and/or location server, described above. Furthermore, the base network equipment apparatus 1200 may include a processor 1205, a memory 1210, an input device 1215, an output device 1220, and a transceiver 1225. In some embodiments, the input device 1215 and the output device 1220 are combined into a single device, such as a touchscreen. In certain embodiments, the network equipment apparatus 1200 may not include any input device 1215 and/or output device 1220. In various embodiments, the network equipment apparatus 1200 may include one or more of: the processor 1205, the memory 1210, and the transceiver 1225, and may not include the input device 1215 and/or the output device 1220.

The processor 1205, in one embodiment, may include any known controller capable of executing computer-readable instructions and/or capable of performing logical operations. For example, the processor 1205 may be a microcontroller, a microprocessor, a CPU, a GPU, an auxiliary processing unit, a FPGA, or similar programmable controller. In some embodiments, the processor 1205 executes instructions stored in the memory 1210 to perform the methods and routines described herein. The processor 1205 is communicatively coupled to the memory 1210, the input device 1215, the output device 1220, and the transceiver 1225.

In various embodiments, the network equipment apparatus 1200 is a RAN node. Here, the processor 1205 controls the network equipment apparatus 1200 to perform the gNB/RAN behaviors described herein.

In various embodiments, the network equipment apparatus 1200 is an AMF. Here, the processor 1205 controls the network equipment apparatus 1200 to perform the AMF behaviors described herein.

In various embodiments, the network equipment apparatus 1200 is a location server. Here, the processor 1205 controls the network equipment apparatus 1200 to perform the location server behaviors described herein.

The memory 1210, in one embodiment, is a computer readable storage medium. In some embodiments, the memory 1210 includes volatile computer storage media. For example, the memory 1210 may include a RAM, including dynamic RAM ("DRAM"), synchronous dynamic RAM ("SDRAM"), and/or static RAM ("SRAM"). In some embodiments, the memory 1210 includes non-volatile computer storage media. For example, the memory 1210 may include a hard disk drive, a flash memory, or any other suitable non-volatile computer storage device. In some embodiments, the memory 1210 includes both volatile and non-volatile computer storage media.

In some embodiments, the memory 1210 stores data related to sidelink timing-based positioning methods. For example, the memory 1210 may store various parameters, configurations, policies, and the like as described above. In certain embodiments, the memory 1210 also stores program code and related data, such as an operating system or other controller algorithms operating on the network equipment apparatus 1200.

The input device 1215, in one embodiment, may include any known computer input device including a touch panel, a button, a keyboard, a stylus, a microphone, or the like. In some embodiments, the input device 1215 may be integrated with the output device 1220, for example, as a touchscreen or similar touch-sensitive display. In some embodiments, the input device 1215 includes a touchscreen such that text may be input using a virtual keyboard displayed on the touchscreen and/or by handwriting on the touchscreen. In some embodiments, the input device 1215 includes two or more different devices, such as a keyboard and a touch panel.

The output device 1220, in one embodiment, is designed to output visual, audible, and/or haptic signals. In some embodiments, the output device 1220 includes an electronically controllable display or display device capable of outputting visual data to a user. For example, the output device 1220 may include, but is not limited to, an LCD display, an LED display, an OLED display, a projector, or similar display device capable of outputting images, text, or the like to a user. As another, non-limiting, example, the output device 1220 may include a wearable display separate from, but communicatively coupled to, the rest of the network equipment apparatus 1200, such as a smart watch, smart glasses, a heads-up display, or the like. Further, the output device 1220 may be a component of a smart phone, a personal digital assistant, a television, a table computer, a notebook (laptop) computer, a personal computer, a vehicle dashboard, or the like.

In certain embodiments, the output device 1220 includes one or more speakers for producing sound. For example, the output device 1220 may produce an audible alert or notification (e.g., a beep or chime). In some embodiments, the output device 1220 includes one or more haptic devices for producing vibrations, motion, or other haptic feedback. In some embodiments, all, or portions of the output device 1220 may be integrated with the input device 1215. For example, the input device 1215 and output device 1220 may form a touchscreen or similar touch-sensitive display. In other embodiments, the output device 1220 may be located near the input device 1215.

The transceiver 1225 includes at least one transmitter 1230 and at least one receiver 1235. One or more transmitters 1230 may be used to communicate with the UE, as described herein. Similarly, one or more receivers 1235 may be used to communicate with network functions in the PLMN and/or RAN, as described herein. Although only one transmitter 1230 and one receiver 1235 are illustrated, the network equipment apparatus 1200 may have any suitable number of transmitters 1230 and receivers 1235. Further, the transmitter(s) 1230 and the receiver(s) 1235 may be any suitable type of transmitters and receivers. In some embodiments, other components such as the network interface 1240 or other hardware components/circuits may be integrated with any number of transmitters 1230 and/or receivers 1135 into a single chip. In such embodiment, the transmitters 1230 and receivers 1235 may be logically configured as a transceiver 1225 that uses one more common control signals or as modular transmitters 1230 and receivers 1235 implemented in the same hardware chip or in a multi-chip module.

Methods

Figure 13:
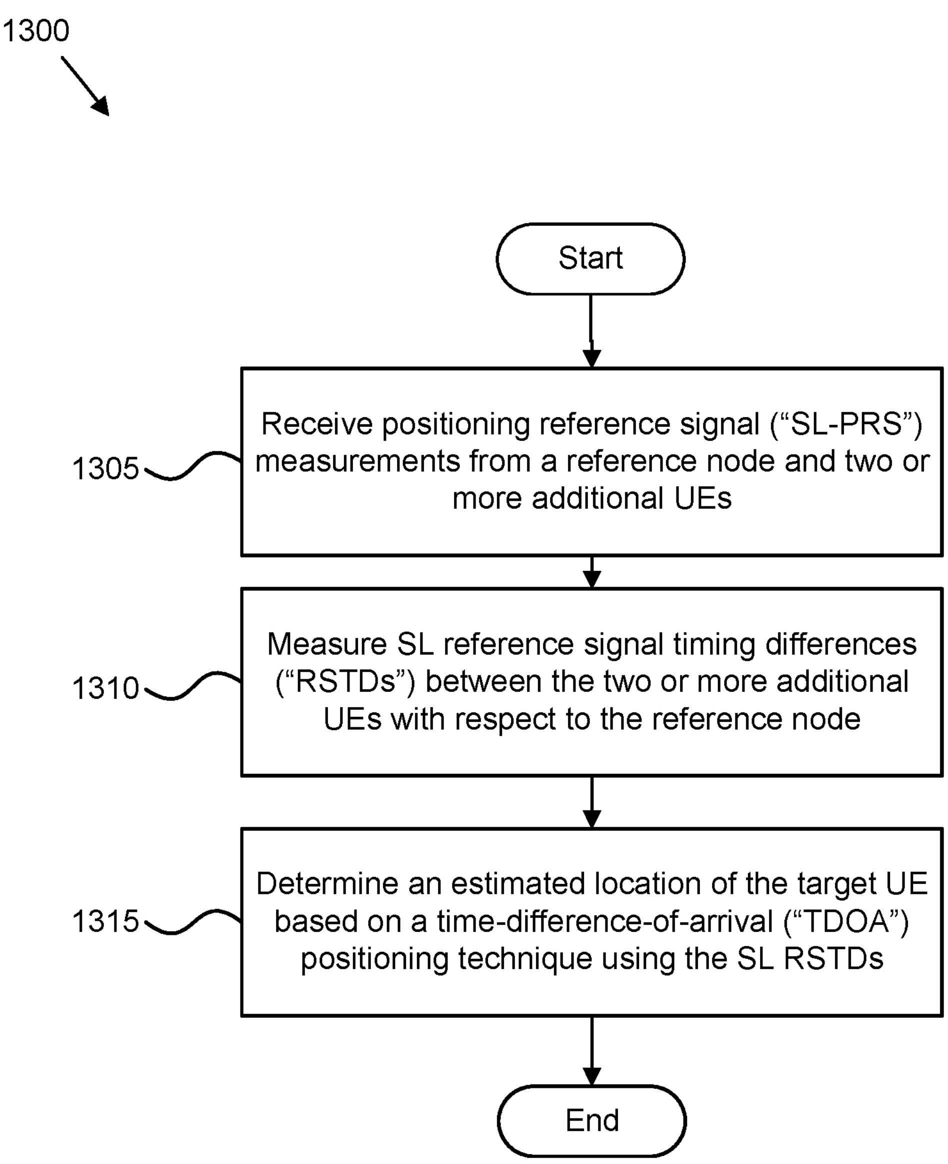
FIG. 13 is a block diagram illustrating an example of a method for SL-TDOA positioning, in accordance with one or more embodiments of the disclosure.

FIG. 13 is a block diagram illustrating an example of a method for SL-TDOA positioning, in accordance with one or more embodiments of the disclosure. In various embodiments, the method 1300 is performed in a communication network comprising of at least a Base Station, User Equipment (UE), and Location server. In some embodiments, the method 1300 is performed by one or more processors, such as a microcontroller, a microprocessor, a CPU, a GPU, an auxiliary processing unit, a FPGA, or the like.

In various embodiments, the method 1300 begins and from the target UE perspective includes for UE based positioning the target UE receiving 1305 positioning reference signal ("SL-PRS") measurements from a reference node and two or more additional UEs. The method 1300 continues and includes measuring 1310 SL reference signal timing differences ("RSTDs") between the two or more additional UEs with respect to the reference node. In some embodiments, the positioning is UE assisted (e.g., LMF calculates target estimated location of target UE based on reported measurements from target UE). In certain embodiments, the SL positioning is UE based (e.g., the UE calculates its own estimated location). In various embodiments, the method 1300 further includes determining 1315 an estimated location of the target UE based on a time-difference-of-arrival ("TDOA") positioning technique using the SL RSTDs. In some embodiments (e.g., UE assisted) the method 1300 may include reporting the SL reference signal time difference measurement to the location server using the Uu interface and/or SL interface. The method 1300 may further include, in certain embodiments, receiving from the location server, a location estimation for the target UE using the time-difference of arrival of the SL-PRS measurements. The method 1300 ends.

In one or more embodiments, the method 1300 may be implemented with a variety of reference and anchor or non-anchor nodes, configurations, techniques, and so forth, such as those described above with respect to FIGS. 6 and 7. Moreover, the method 1300 may be performed by the UE apparatus 1100 described above with respect to FIG. 1100. Corresponding methods 1300 may be performed by a network equipment apparatus 1200 which may include a location server and/or an LMF that assists in performing one or more method steps of the method 1300 or variations thereof.

Figure 14:
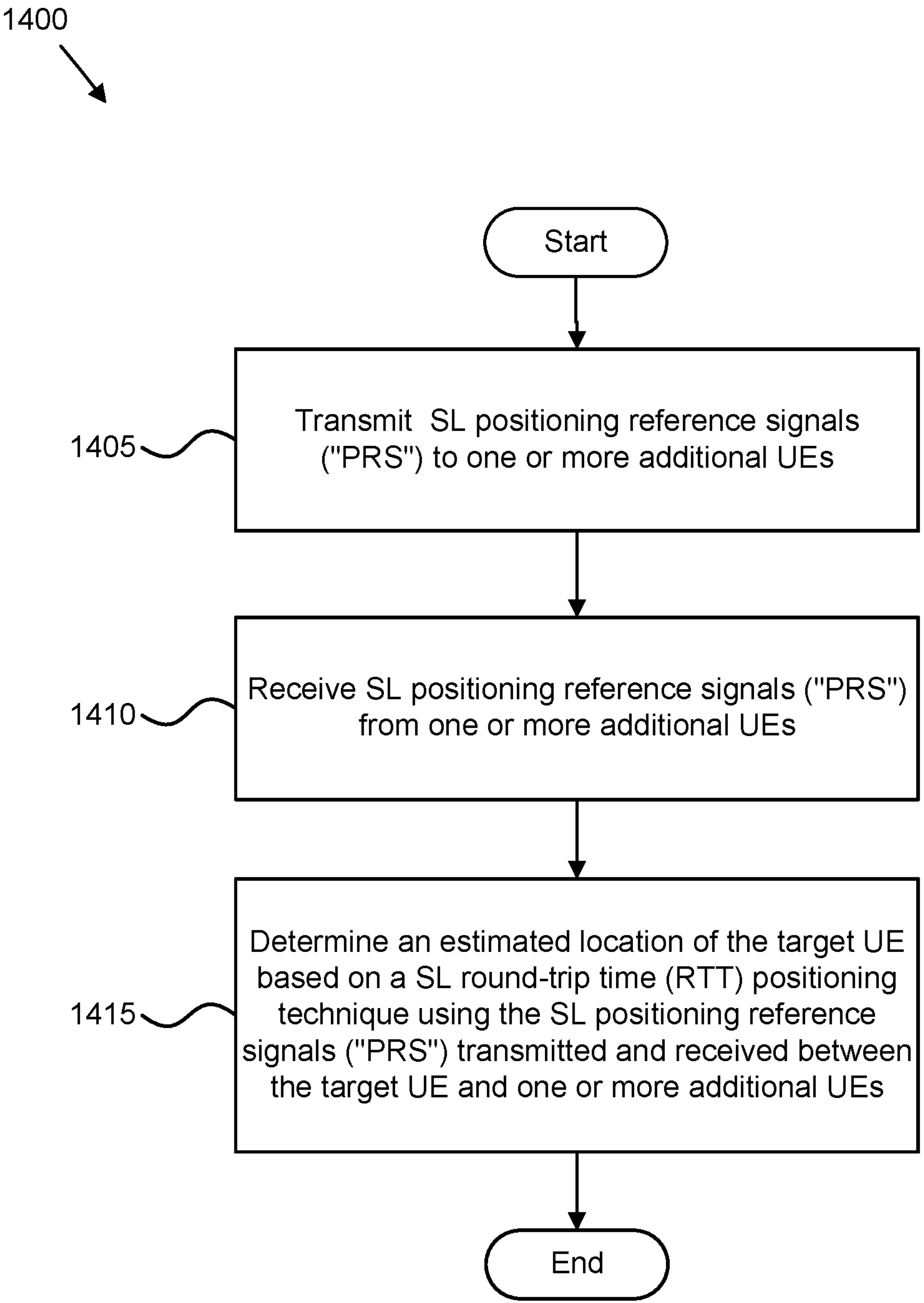
FIG. 14 is a block diagram illustrating and example of a method for sidelink timing-based positioning methods using SL-RTT, in accordance with one or more embodiments of the disclosure.

FIG. 14 is a block diagram illustrating an example of a method for sidelink timing-based positioning methods using SL-RTT, in accordance with one or more embodiments of the disclosure. In some embodiments, the method 1400 is performed by a UE, such as the remote unit 105 in communication with a base station, one or more anchor or non-anchor reference nodes, and/or a location server, as described above. In various embodiments, the steps of the method 1400 may be performed by a processor, such as a microcontroller, a microprocessor, a CPU, a GPU, an auxiliary processing unit, a FPGA, or the like.

In an example implementation, the method 1400 begins and in various embodiments, includes a target UE transmitting 1405 SL positioning reference signals ("PRS") to one or more additional UEs. The method 1400 continues and includes the target UE receiving 1410 SL positioning reference signals from a one or more additional UEs and determining 1415 an estimated location of the target UE based on a SL round-trip time (RTT) positioning technique using the SL positioning reference signals ("PRS") transmitted and received between the target UE and one or more additional UEs, where: one or more SL UE Rx-Tx differences for determining the SL RTTs are obtained by: measuring the received timing of the SL subframes containing PRS; measuring the difference between the transmit and receive timing of the SL subframes containing PRS; and computing the one or more SL UE Rx-Tx timing differences.

In one or more embodiments, the method 1400 may be implemented with a variety of reference and anchor or non-anchor nodes, configurations, techniques, and so forth, such as those described above with respect to FIGS. 6 and 7. Moreover, the method 1400 may be performed by the UE apparatus 1100 described above with respect to FIG. 1100. Corresponding methods 1400 may be performed by a network equipment apparatus 1200 which may include a location server and/or an LMF that assists in performing one or more method steps of the method 1400 or variations thereof.

Various example implementations include a UE apparatus for a communication network including a target UE to be localized using sidelink ("SL") timing-based positioning, the target UE including a processor, memory, and program code executable by the processor to cause the UE to: receive positioning reference signal ("SL-PRS") measurements from the reference node and the two or more additional UEs; measure SL reference signal timing differences ("RSTDs") between the two or more additional UEs with respect to the reference node; and determine an estimated location of the target UE based on a time-difference-of-arrival ("TDOA") positioning technique using the SL RSTDs. In some UE-based example implementations, the target UE determines the estimated location by locally computing the estimated location based on the time-difference-of-arrival ("TDOA") positioning technique using the SL RSTDs. In one or more UE assisted example implementations, the target UE determines the estimated location by: reporting the SL RSTDs measurements to a location server (or to an LMF implemented as core network function) using an interface selected from a Uu interface, a SL interface, or both; and receiving the estimated location from the location server (or the LMF) based on the time-difference-of-arrival ("TDOA") positioning technique using the SL RSTDs measurement being computed by the location server.

In various example implementations, the target UE receives location information for the two or more additional UEs, the location information selected from: absolute location information received from anchor UEs included within the two or more additional UEs; absolute location information received from a location management function ("LMF") of the communication network for non-anchor UEs included among the two or more additional UEs by the LMF determining the respective absolute locations of the non-anchor UEs; and combinations thereof.

In certain example implementations, the reference node is a fixed node selected from a base station, a roadside unit ("RSU"), a SL-UE, and a vulnerable road user ("VRU") and the reference node transmits a SL positioning reference signal ("PRS"). In some example implementations, the target UE, measures the RSTD based on received positioning reference signals.

In one or more example implementations, the reference node is anon-anchor mobile node selected from a SL-UE and a VRU. In certain implementations, the two or more additional UEs are non-anchor nodes. In various implementations, the target UE receives from a non-anchor mobile reference node, SL PRS configurations corresponding to SL transmission reception points (TRPs) originating from the non-anchor mobile reference node and the two or more additional UEs.

In various implementations, a groupcast communication session is initiated between a vehicle-to-everything ("V2X") layer and a LMF to perform the SL-TDOA positioning technique as configured. In certain example implementations, the reference node is a mobile reference node selected from a SL-UE and a VRU, the two or more additional UEs are non-anchor nodes, and the target UE receives from the LMF certain identities and SL PRS configurations corresponding to SL transmission reception points (TRPs) originating from mobile reference node and the two or more additional UEs, and relative locations of the two or more additional UEs with respect to the mobile reference node based on the groupcast communication session initiated between the V2X layer and the LMF.

In some example implementations, the UE receives the SL-PRS transmitted using one or more SL channels selected from Physical Sidelink Control Channels ("PSCCHs"), Physical Sidelink Broadcast Channels ("PSBCHs"), and Physical Sidelink Shared Channels ("PSSCH"), and combinations thereof. In certain example implementations, the SL PRS received by the target UE are configured and measured at a plurality of time instances corresponding to points along a trajectory of the target UE. In one or more example implementations, the nodes among the reference node and the two or more additional UEs which are transmitting the SL PRS are configured to report the transmit time periodically to compensate for real time difference ("RTD") offsets in performing the TDOA positioning technique.

A further example UE apparatus for a communication network includes a target UE to be localized using sidelink ("SL") timing-based positioning, the target UE comprising a processor, memory, and program code executable by the processor to cause the target UE to transmit SL positioning reference signals ("PRS") to one or more additional UEs, receive SL positioning reference signals from a one or more additional UEs, and determine an estimated location of the target UE based on a SL round-trip time (RTT) positioning technique using the SL positioning reference signals ("PRS") transmitted and received between the target UE and one or more additional UEs. In certain example implementations, the one or more SL UE Rx-Tx differences for determining the SL RTTs are obtained by measuring the received timing of the SL subframes containing PRS, measuring the difference between the transmit and receive timing of the SL subframes containing PRS, and computing the one or more SL UE Rx-Tx timing differences. In some example implementations, the target UE receives SL-RTT configuration based on a unicast communication session and transmits a Rx-Tx difference measurement report to the location management function ("LMF") of the communication network to use with corresponding Rx-Tx difference measurement reports from the one or more additional UEs that are mobile UEs to perform the SL-RTT positioning technique as configured.

In some example implementations, the target UE performs one or more actions selected from: receiving a request from a location server or a location management function ("LMF") to provide capability information related to the SL timing-based positioning and transmitting the requested capability information related to the SL timing-based positioning to the location server or the LMF; and transmitting a request to the location server or the location management function ("LMF") to provide assistance data related to the SL timing-based positioning and receiving the requested assistance data related to the SL timing-based positioning from the location server or the LMF.

In various example implementations involving UE assisted sidelink timing-based positioning, a location server or an LMF implemented on the location server or implemented as a core network function receives reports from the target UE and/or one, two, or more additional UEs that may include anchor or non-anchor nodes.

In one or more example implementation, a method for a location server or a location management function ("LMF") implemented on the location server or implemented as a standalone core network function of a communication network includes determining an estimated location of a target UE to be localized using one or more sidelink timing-based positioning techniques selected from a sidelink timing-based positioning technique that include receiving, from the target UE to be localized, a report comprising two or more sidelink ("SL") reference signal timing differences ("RSTDs") between the target UE and two or more additional UEs with respect to a reference node, the SL RSTDs based on SL positioning reference signals ("PRS") from the reference node and the two or more additional UEs and determining an estimated location of the target UE using a time-difference-of-arrival ("TDOA") positioning technique based on the SL RSTDs.

In certain example implementations, a method for a location server or a location management function ("LMF") implemented on the location server or implemented as a standalone core network function of a communication network includes receiving, from the target UE to be localized, a report comprising of one or more SL RTT measurements between the target UE and one or more additional UEs and determining an estimated location of the target UE using a SL-RTT positioning technique based on the UE Rx-Tx time difference measurements. As described above, with any of the apparatuses, systems, or methods disclosed herein, various non-anchor nodes may be transformed into anchor nodes using certain steps described above.

The apparatuses, systems, or methods disclosed herein improve UE localization technology be providing more accurate and SL based positioning techniques with low latency including SL TDOA and SL RTT that may be UE assisted where timely access to a location server or LMF is available and may be UE based where timely access to a location server or LMF is unavailable for a particular period of time.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:

at least one memory; and at least one processor coupled with the at least one memory and configured to cause the UE to:

receive a set of sidelink ("SL") positioning reference signals ("SL-PRS") measurements from a reference node and two or more additional UEs;

measure a set of SL reference signal timing differences ("RSTDs") between the two or more additional UEs with respect to the reference node;

receive, from the reference node or the two or more additional UEs, transmit time information to compensate for real time difference ("RTD") offsets in performing a time-difference-of-arrival ("TDOA") positioning technique; and determine an estimated location of the UE based on the TDOA positioning technique using the set of SL RSTDs.

2. The UE of claim 1, wherein to determine the estimated location, the at least one processor is configured to cause the UE to:

locally compute the estimated location based on the TDOA positioning technique using the set of SL RSTDs.

3. The UE of claim 1, wherein to determine the estimated location, the at least one processor is configured to cause the UE to:

report the set of SL RSTDs measurements to a location server using an interface selected from a Uu interface, a SL interface, or both; and determine the estimated location based at least in part on a response received from the location server.

4. The UE of claim 1, wherein the at least one processor is configured to cause the UE to receive location information for the two or more additional UEs, and wherein the location information comprises:

first absolute location information received from one or more anchor UEs of the two or more additional UEs, wherein the first absolute location information comprises respective absolute locations of the one or more anchor UEs; or second absolute location information received from a location management function ("LMF") for one or more non-anchor UEs of the two or more additional UEs, wherein the second absolute location information comprises respective absolute locations of the one or more anchor UEs.

5. The UE of claim 1, wherein the reference node is a fixed node selected from a base station, a roadside unit ("RSU"), a SL-UE, or a vulnerable road user ("VRU"); and wherein the processor is configured to cause the UE to measure the RSTD based on at least one SL-PRS received from the reference node.

6. The UE of claim 1, wherein the reference node is a non-anchor mobile node selected from a SL-UE or a vulnerable road user ("VRU");

wherein the two or more additional UEs are non-anchor nodes; and wherein the processor is configured to cause the UE to receive, from the non-anchor mobile node, one or more SL-PRS configurations corresponding to a set of SL transmission reception points ("TRPs") originating from the non-anchor mobile node and the two or more additional UEs.

7. The UE of claim 1, wherein the at least one processor is configured to cause the UE to initiate a groupcast communication session between a vehicle-to-everything ("V2X") layer and a location management function ("LMF") to perform the TDOA positioning technique.

8. The UE of claim 7, wherein the reference node is a mobile reference node selected from a SL-UE and a vulnerable road user ("VRU");

wherein the two or more additional UEs are non-anchor nodes; and wherein the processor is configured to cause the UE to receive from the LMF:

identities and SL-PRS configurations corresponding to a set of SL transmission reception points ("TRPs") originating from the mobile reference node and the two or more additional UEs; and relative locations of the two or more additional UEs with respect to the mobile reference node based on the groupcast communication session initiated between the V2X layer and the LMF.

9. The UE of claim 1, wherein the at least one processor is configured to cause the UE to receive the set of SL-PRS using one or more SL channels selected from Physical Sidelink Control Channels ("PSCCHs"), Physical Sidelink Broadcast Channels ("PSBCHs"), and Physical Sidelink Shared Channels ("PSSCH"), or a combination thereof.

10. The UE of claim 1, wherein the set of SL-PRS are configured and measured at a plurality of time instances corresponding to points along a trajectory of the UE.

11. A method performed by a User Equipment ("UE"), the method comprising:

receiving a set of sidelink ("SL") positioning reference signals ("SL-PRS") measurements from a reference node and two or more additional UEs;

measuring a set of SL reference signal timing differences ("RSTDs") between the two or more additional UEs with respect to the reference node;

receiving, from the reference node or the two or more additional UEs, transmit time information to compensate for real time difference ("RTD") offsets in performing a time-difference-of-arrival ("TDOA") positioning technique; and determining an estimated location of the UE based on the TDOA positioning technique using the set of SL RSTDs.

12. The method of claim 11, wherein determining the estimated location comprises:

locally computing the estimated location based on the TDOA positioning technique using the set of SL RSTDs.

13. The method of claim 11, wherein determining the estimated location comprises:

reporting the set of SL RSTDs measurements to a location server using an interface selected from a Uu interface, a SL interface, or both; and determining the estimated location based at least in part on a response received from the location server.

14. The method of claim 11, further comprising receiving location information for the two or more additional UEs, wherein the location information comprises:

first absolute location information received from one or more anchor UEs of the two or more additional UEs, wherein the first absolute location information comprises respective absolute locations of the one or more anchor UEs; or second absolute location information received from a location management function ("LMF") for one or more non-anchor UEs of the two or more additional UEs, wherein the second absolute location information comprises respective absolute locations of the one or more anchor UEs.

15. The method of claim 11, wherein the reference node is a fixed node selected from a base station, a roadside unit ("RSU"), a SL-UE, or a vulnerable road user ("VRU"), and wherein the method further comprises measuring the RSTD based on at least one SL-PRS received from the reference node.

16. The method of claim 11, wherein the reference node is a non-anchor mobile node selected from a SL-UE or a vulnerable road user ("VRU");

wherein the two or more additional UEs are non-anchor nodes; and wherein the method further comprises receiving, from the non-anchor mobile node, one or more SL-PRS configurations corresponding to a set of SL transmission reception points ("TRPs") originating from the non-anchor mobile node and the two or more additional UEs.

17. The method of claim 11, further comprising initiating a groupcast communication session between a vehicle-to-everything ("V2X") layer and a location management function ("LMF") to perform the TDOA positioning technique.

18. The method of claim 17, wherein the reference node is a mobile reference node selected from a SL-UE and a vulnerable road user ("VRU");

wherein the two or more additional UEs are non-anchor nodes; and wherein the method further comprises receiving from the LMF:

identities and SL-PRS configurations corresponding to a set of SL transmission reception points ("TRPs") originating from the mobile reference node and the two or more additional UEs; and relative locations of the two or more additional UEs with respect to the mobile reference node based on the groupcast communication session initiated between the V2X layer and the LMF.

19. The method of claim 11, further comprising receiving the set of SL-PRS using one or more SL channels selected from Physical Sidelink Control Channels ("PSCCHs"), Physical Sidelink Broadcast Channels ("PSBCHs"), and Physical Sidelink Shared Channels ("PSSCH"), or a combination thereof.

20. The method of claim 11, wherein the set of SL-PRS are configured and measured at a plurality of time instances corresponding to points along a trajectory of the UE.

* * * * *